United States Patent [19]
Shetty

[11] 3,761,480
[45] Sept. 25, 1973

[54] PROCESS FOR THE PREPARATION OF 3-ARYL-6-SULFAMYL-7-HALO-1,2,3,4-TETRAHYDRO-4-QUINAZOLINONES

[75] Inventor: Bola Vithal Shetty, Rochester, N.Y.

[73] Assignee: Pennwalt Corporation, Philadelphia, Pa.

[22] Filed: Mar. 15, 1972

[21] Appl. No.: 235,087

Related U.S. Application Data

[63] Continuation of Ser. No. 874,960, Nov. 7, 1969, abandoned, which is a continuation-in-part of Ser. No. 743,615, July 10, 1968, Pat. No. 3,567,746.

[52] U.S. Cl... 260/256.5 R, 260/244 A, 260/518 A, 260/558 B, 260/500 R, 260/999
[51] Int. Cl............................................. C07d 51/48
[58] Field of Search ............................ 260/256.5 R

[56] References Cited
OTHER PUBLICATIONS

Armarego, Fused Pyrimidines, Part I, Interscience, N.Y., pp. 392–3 (1967).

Theilheimer, Synthetic Methods of Organic Chemistry, S. Karger, N.Y., 4–138, 17–187, 19–204.5 (1950, 1963, 1965).

Wagner et al., Synthetic Organic Chemistry, Wiley, N.Y., pp. 567–568, 665 (1953).

*Primary Examiner*—Richard J. Gallagher
*Attorney*—Charles E. Feeny et al.

[57] ABSTRACT

3-Aryl-6-sulfamyl-7-halo-1,2,3,4-tetrahydro-4-quinazolinones useful as diuretics and saluretics are prepared by reacting a 2-amino-4-halo-5-sulfamyl-N-(aryl) benzamide with an acetal, aldehyde, or ketone. For example, 2-amino-4-chloro-5-sulfamyl-N-(o-tolyl) benzamide is reacted with dimethyl acetal to give 2-methyl-3-(o-tolyl)-6-sulfamyl-7-chloro-1,2,3,4-tetrahydro-4-quinazolinone.

9 Claims, No Drawings

PROCESS FOR THE PREPARATION OF 3-ARYL-6-SULFAMYL-7-HALO-1,2,3,4-TETRAHYDRO-4-QUINAZOLINONES

CROSS-REFERENCES TO RELATED APPLICATIONS

This is a continuation of application Ser. No. 874,960, filed Nov. 7, 1969, now abandoned, which in turn is a continuation-in-part of application Ser. No. 743,615, filed July 10, 1968, now U. S. Pat. No. 3,567,746.

The invention relates to quinazolinones which are effective as diuretics.

According to the invention there are provided 6-sulfamyl-1,2,3,4-tetrahydro-4-quinazolinones represented by the formula

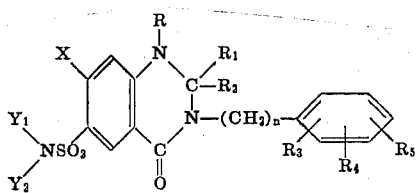

or a salt thereof, wherein X is halogen or trifluoromethyl; $Y_1$ and $Y_2$ are independently hydrogen, alkyl or acyl; R is hydrogen, alkyl, aryl, or aralkyl; $R_1$ and $R_2$ are independently hydrogen, alkyl haloalkyl, hydroxyalkyl, alkoxyalkyl, thioalkyl, alkylthioalkyl, haloalkylthioalkyl, arylthioalkyl, cycloalkyl, cycloalkylalkyl, aryl or aralkyl; $R_1$ and $R_2$ taken together with the carbon atom to which they are attached are a cycloalkyl group or a heterocyclic group; n is 0 or an integer from 1 to 4; and $R_3$, $R_4$ and $R_5$ are independently hydrogen, alkyl, alkoxy, hydroxy, halogen, trifluoromethyl or the radical -$SO_2NH_2$.

The compounds provided by the invention are prepared by a process which comprises reacting an anthranilamide represented by the formula

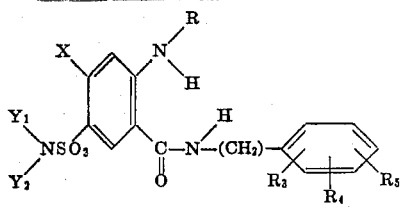

with an acetal, aldehyde or ketone represented, respectively, by the formulas

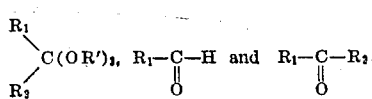

wherein R' is a hydrocarbon group; and,
a. when R is benzyl, optionally hydrogenating the product thus obtained to replace said benzyl with a hydrogen atom.
b. when $Y_1$ and $Y_2$ are hydrogen, optionally reacting the product thus obtained with an alkylating or acylating agent to replace at least one of the hydrogen atoms with an alkyl or acyl group, respectively, and, if desired, reacting the resulting product with an acid or a base to provide a salt.

In the above structural formula X is preferably chlorine or trifluoromethyl, but bromine and the other halogens are not precluded. R is preferably hydrogen, but alkyl groups such as methyl, ethyl, propyl and isopropyl may be used. $R_1$ and $R_2$ are preferably hydrogen and methyl or ethyl. The aralkyl group is preferably a monocyclic carbocyclic aryl alkyl, e.g., benzyl, but bicyclic carbocyclic aralkyl may be used, e.g. 1- or 2-naphthyl-methyl. $R_3$, $R_4$, and $R_5$ may be any of the stated radicals in one or more of the ortho, meta or para positions. Preferably $R_3$ is methyl in the ortho position; also where sulphamyl is used it is preferably present in the meta or para position with methyl in the ortho position. $R_1$ or $R_2$ may be aryl and is preferably like the aryl part of aralkyl or $R_1$ or $R_2$. The substitute aryl of $R_1$ or $R_2$ and the substituted aralkyl of $R_2$ are suitably substituted with hydroxy, alkoxy, alkyl, halogen, $SO_2NH_2$, trifluoromethyl and/or $NH_2$.

The terms "alkyl" and "alkoxy" denote alkyl and alkoxy groups which advantageously contain not more than 8 carbon atoms and preferably contain one-four carbon atoms.

Specific suitable compounds of the above formula include 2-methyl-3-o-tolyl-6-sulphamyl-7-chloro-1,2,3,4-tetra-hydro-4-quinazolinone; 2-methyl-3-o-tolyl-6-sulphamyl-7-tri-fluoromethyl-1,2,3,4-tetrahydro-4-quinazolinone; 3-o-tolyl-6-sulphamyl-7-chloro-1,2,3,4-tetrahydro-4-quinazolinone; 2-ethyl-3-o-tolyl-6-sulphamyl-7-trifluoromethyl-1,2,3,4-tetrahydro-4-quinazolinone; 2-ethyl-3-o-tolyl-6-sulphamyl-7-chloro-1,2,3,4-tetrahydro-4-quinazolinone; 2-methyl-3-o-tolyl-6-methylamino-sulphonyl-7-chloro-1,2,3,4-tetrahydro-4-quinazolinone; 2-methyl-3-(p-chlorophenyl)-6-sulphamyl-7-chloro-1,2,3,4-tetrahydro-4-quinazolinone; 2-methyl-3-o-tolyl-6-methylaminosulphonyl-7-chloro-1,2,3,4-tetrahydro-4-quinazolinone; 2-methyl-3-phenyl-6-sulphamyl-7-chloro-1,2,3,4-tetrahydro-4-quinazolinone; 2-methyl-3-(2'-methyl-3'-chlorophenyl)-6-sulphamyl-7-chloro-1,2,3,4-tetrahydro-4-quinazolinone; 2-methyl-2-(p-chlorophenyl)-6-methylaminosulphonyl-7-chloro-1,2,3,4-tetrahydro-4-quinazolinone; 2-methyl-3-(2'-methylbenzyl)-6-sulphamyl-7-chloro-1,2,3,4-tetrahydro-4-quinazolinone; 2-phenyl-3-o-tolyl-6-sulphamyl-7-chloro-1,2,3,4-tetrahydro-4-quinazolinone; 2-propyl-3-o-tolyl-6-sulphamyl-7-chloro-1,2,3,4-tetrahydro-4-quinazolinone; 2-butyl-3-o-tolyl-6-sulphamyl-7-chloro-1,2,3,4-tetrahydro-4-quinazolinone; 2-propyl-3-o-tolyl-6-sulphamyl-7-trifluoromethyl-1,2,3,4-tetrahydro-4-quinazolinone; 2-butyl-3-o-tolyl-6-sulphamyl-7-trifluoromethyl-1,2,3,4-tetrahydro-4-quinazolinone; 2-benzylthiomethyl-3-o-tolyl-6-sulphamyl-7-chloro-1,2,3,4-tetrahydro-4-quinazolinone; 2-(2,2,2-trifluoroethylthiomethyl)-3-o-tolyl-6-sulphamyl-7-chloro-1,2,3,4-tetrahydro-4-quinazolinone; 2-ethylthiomethyl-3-o-tolyl-6-sulphamyl-7-chloro-1,2,3,4-tetrahydro-4-quinazolinone; 2-chloromethyl-3-o-tolyl-6-sulphamyl-7-chloro-1,2,3,4-tetrahydro-4-quinazolinone; 2-dichloromethyl-3-o-tolyl-6-sulphamyl-7-chloro-1,2,3,4-tetrahydro-4-quinazolinone; 2-trichloromethyl-3-o-tolyl-6-sulphamyl-7-chloro-1,2,3,4-tetrahydro4-quinazolinone; 2-benzyl-3-o-tolyl-6-sulphamyl-7-chloro-1,2,3,4-tetrahydro-4-quinazolinone; 2-(3'-sulphamyl-4'-chlorophenyl)-3-o-tolyl-6-sulphamyl-7-chloro-1,2,3,4-tetrahydro-4-quinazolinone; 2-(3'-sulphamyl-4'-chlorobenzyl)-3-o-tolyl-6-sulphamyl-7-chloro-1,2,3,4-tetrahydro-4-quinazolinone; 2-methyl-3-(o-hydroxyphenyl)-6-sulphamyl-7-chloro-1,2,3,4- tetrahydro-4-quinazolinone; 2-methyl-3-(o-methoxyphenyl)-6-sulphamyl-7-chloro-1,2,3,4-tetrahydro-4-quinazolinone; 2-methyl-3-(p-aminophenyl)-6-sulphamyl-7-chloro-1,2,3,4-tetrahydro-4-quinazolinone; 2-methyl-3-(2'-methyl)-4'-aminophenyl)-6-sulphamyl-7-chloro-1,2,3,4-tetrahydro-4-quinazolinone; 2-methyl-3-(2'-methyl-3'-sulphamylphenyl)-6-sulphamyl-7-chloro-1,2,3,4-tetrahydro-4-quinazolinone; 2-methyl-3-(2'-methyl-3'-sulphamylphenyl)-6-sulphamyl-7-trifluoromethyl-1,2,3,4-tetrahydro-4-quinazolinone; 2-ethyl-3-(2'-methyl-3'-chlorophenyl)-6-sulphamyl-7-trifluoromethyl-1,2,3,4-tetrahydro-4-quinazolinone; 2-methyl-3-(2'-methyl-3'-chlorophenyl)-6-methylamino-sulphonyl-7-chloro-1,2,3,4-tetrahydro-4-quinazolinone; 2-ethyl-3-(2'-sulphamylphenyl)-6-sulphamyl-7-chloro-1,2,3,4-tetrahydro-4-quinazolinone; 2-cyclopentylmethyl-3-o-tolyl-6-sulphamyl-7-chloro-1,2,3,4-tetrahydro-4-quinazolinone; 2-cyclobutyl-3-o-tolyl-6-sulphamyl-7-chloro-1,2,3,4-tetrahydro-4-quinazolinone; 2-cyclobutyl-3-o-tolyl-6-sulphamyl-7-trifluoromethyl-1,2,3,4-tetrahydro-4-quinazolinone; 2-cyclopropylmethyl-3-o-tolyl-6-sulphamyl-7-chloro-1,2,3,4-tetrahydro-4-quinazolinone; 2-cyclopropyl-3-o-tolyl-6-sulphamyl-7-trifluoromethyl-1,2,3,4-tetrahydro-4-quinazolinone; 2-methyl-3-benzyl-6-sulphamyl-7-chloro-1,2,3,4-tetrahydro-4-quinazolinone; 2-pentamethylene-3-o-tolyl-6-sulphamyl-7-chloro-1,2,3,4-tetrahydro-4-quinazolinone; 1,2-dimethyl-3-o-tolyl-6-sulphamyl-7-chloro-1,2,3,4-tetrahydro-4-quinazolinone; 1-benzyl-2-methyl-3-o-toly-6-sulphamyl-7-chloro-1,2,3,4-tetrahydro-4-quinazolinone; 2-methyl-3-(2'-methyl-4'-chlorophenyl)-6-sulphamyl-7-chloro-1,2,3,4-tetrahydro- 4-quinazolinone; 2-cyclobutylmethyl-3-o-tolyl-6-sulphamyl-7-chloro-1,2,3,4-tetrahydro-4-quinazolinone; 2-methyl-3-(2'-trifluoromethyl-4'-aminophenyl)-6-sulphamyl-7-chloro-1,2,3,4-tetrahydro-4-quinazolinone; the sodium salt of 2-methyl-3-o-tolyl-6-sulphamyl-7-chloro-1,2,3,4-tetrahydro-4-quinazolinone; the potassium salt of 2-methyl-3-o-tolyl-6-sulphamyl-7-chloro-1,2,3,4-tetrahydro-4-quinazolinone, and 2-methyl-3-(o-trifluoromethylphenyl)-6-sulphamyl-7-chloro-1,2,3,4-tetrahydro-4-quinazolinone which may be produced by the hydrogenation of 2-methyl-3-(o-trifluoromethylphenyl)-6-sulphamyl-7-chloro-4-(3H)-quinazolinone.

The preparation of the compounds is suitably carried out in a solvent or in a suspending medium under acid conditions, a molar excess of the acetal, aldehyde or ketone being preferably used. It is sometimes advisable to conduct the reaction at an elevated temperature in order to bring the reaction to completion within a convenient time.

REPRESENTATIVE REACTION SCHEME

Synethesis of 2-Methyl-3-(o-tolyl)-6-sulfamyl-7-chloro-1,2,3,4-tetrahydro-4-quinazolinone

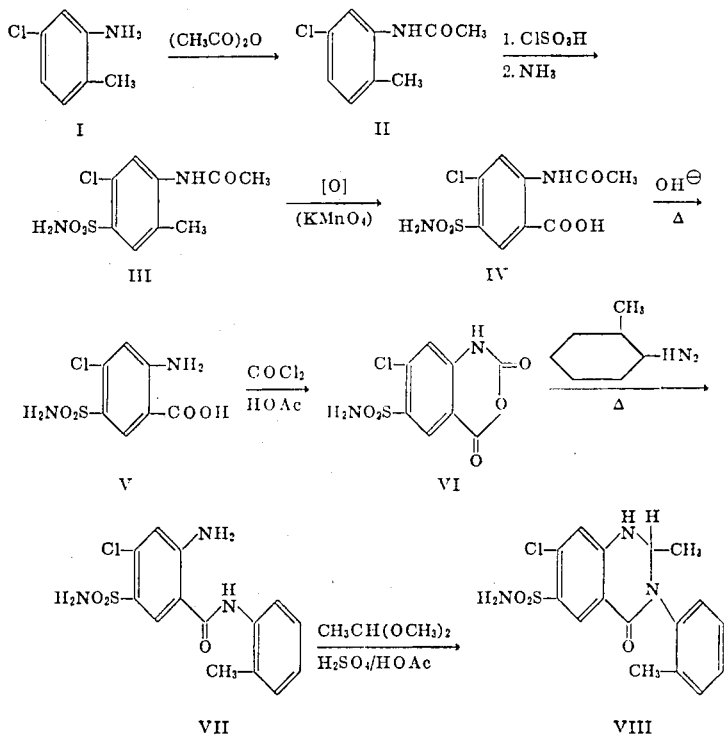

PREPARATION OF INTERMEDIATE COMPOUNDS

Procedure I

Preparation of 5-Chloro-2-methylacetanilide, II

5-Chloro-o-toluidine (I), (1000 gm.) was added to 9000 ml. of water, preheated to 35°, in a 4½ gallon battery jar. The slurry was vigorously stirred while 1260 gm. acetic anhydride was carefully added. Stirring was continued for four hours, then the product was filtered off and air dried. The crude product was recrystallized from 7,500 ml. of benzene, using 40 gm. charcoal to remove some colored material. The product was air dried. It weighed 818 gm. and melted at 138–139°.

Procedure II

Preparation of 5-Chloro-2-methyl-4- sulfamylacetanilide, III

Chlorosulfonic acid (1000 gm.) was placed in a nitrogen flushed 5 liter, 3 neck round bottom flask fitted with a stirrer and a calcium chloride tube. 5-Chloro-2-methylacetanilide (300 gm.) was cautiously added to the chlorosulfonic acid, and then 88 gm. sodium chloride was added portionwise over one hour. The reaction mixture was cautiously raised to 80°C. (foaming occurs). When the foaming had subsided, the temperature was raised to 92°C. and held there for three hours. The hot reaction mixutre was added slowly with good agitation to 4,000 ml. of acetone and 1,500 gm. of ice. The resulting slurry was diluted with water to a total volume of 8,000 ml. and the crude sulfonyl chloride was filtered off and washed with water. The damp filter cake was added to 3,000 ml. of concentrated ammonium hydroxide, stirred at room temperature for 1 hour and then heated to 50°C. for 2 hours. The slurry was cooled, filtered, washed with water and air dried. The weight of product was 186 gm. It melted at 248–250°.

Procedure III
Preparation of N-Acetyl-4-chloro-5-sulfamyl-anthranilic acid, IV

Into a 12 liter flask was introduced 8,000 ml. water, 1144 gm. magnesium sulfate heptahydrate and 400 gm. 5-Chloro-2-methyl-4-sulfamylacetanilide. The mixture was heated to 80° and 710 gm. potassium permanganate was added portionwise with good stirring over about 4 hours at 80–85°. The mixture was kept at 80–85° for 3 hours after the permanganate addition was completed and then it was filtered hot. The manganese dioxide cake was washed with three 1,000 ml. portions of water.

The filtrate was made acid with 200 ml. concentrated hydrochloric acid, filtered, washed with water and air dried. This material was dissolved 95% ethanol. The resulting solution was concentrated, periodically filtering off the product that had crystallized out and washing this with 95% ethanol. The purified product melted at 264–266°.

Procedure IV
Preparation of 4-Chloro-5-sulfamylanthranilic acid, V

N-Acetyl-4-chloro-5-sulfamylanthranilic acid (2,500 gm.) was refluxed for 3 hours in 15,000 ml. 3N sodium hydroxide solution, then brought to a pH of four with concentrated hydrochloric acid. After allowing it to cool to about 70°, the product was filtered off and washed with water. The wet product was dissolved in 200 liters of boiling water, filtered hot and allowed to cool. When filtered, washed with water and air dried, the product weighed 2,000 gm. and melted at 275–276°.

Procedure V
Preparation of 7-Chloro-6-sulfamylisatoic anhydride, VI

4-Chloro-5-sulfamylanthranilic acid (664 gm.) was slurried in 8,000 ml. glacial acetic acid and 800 gm. liquid phosgene was added with good stirring. It was stirred vigorously for 3 hours at room temperature, filtered and washed with 1,000 ml. acetic acid and 2,000 ml. anhydrous ether. After drying in vacuo over phosphorous pentoxide, it weighed 698 gm. and melted at 290–292°.

Procedure VI
Preparation of 2-Amino-4-chloro-5-sulfamyl-N-(o-tolyl)-benz-amide, VII 7-Chloro-6-sulfamylisatoic anhydride (720 gm.) was added to a 12 liter nitrogen flushed flask containing 4,200 ml. o-toluidine and the mixture was stirred for one-half hour. It was then heated to 178° (solution occurred at 177°) and kept at about 175° for 10 minutes. It was allowed to cool to 60° by removing the heating mantle, then cooled rapidly to 25° with an ice bath. Ether (4,200 ml.) was added, the mixture was stirred for a few minutes, filtered and washed thoroughly with ether. The crude product was slurried with 9,000 ml. isopropanol, filtered, washed twice with 2000 ml. isopropanol, twice with 2500 ml. 8% aqueous ammonia, once with 2,000 ml. ether. After air drying, the product weighed 560 gm. and melted at 287–289°. This partially purified amide was recrystallized. The amide was dissolved in dimethylformamide, filtered with celite and heated to 90°. To the resulting solution was added all at once to 95° water. The suspension that resulted was allowed to cool with stirring over 20 hours, then filtered and washed with 2:1 dimethylformamide: water, methanol and ether. After drying the product melted at 289–292° with decomposition.

Analysiss:

|  | C | H | N | Cl |
|---|---|---|---|---|
| Calcd. for $C_{14}H_{14}ClN_3O_3S$: | 49.48 | 4.15 | 12.36 | 10.43 |
| Found: | 94.66 | 4.23 | 12.41 | 10.43 |
| S |  |  |  |  |
| 9.44 |  |  |  |  |
| 9.55 |  |  |  |  |

Procedure VII
Preparation of 2,4-Dichloro-5-carboxy-benzenesulfonylchloride 2,4-Dichlorobenzoic acid (200 gm.) was added over 10 minutes to 1 kg. chlorosulfonic acid. The mixture was stirred 4 hours at 160°, and added to a mixture of ice and water. The solid was filtered, washed with water and sucked as dry as possible. The product (2,4-dichloro-5-carboxy-benzenesulfonyl chloride) was used in the next step without further purification.

Procedure VIII
Preparation of 2,4-Dichloro-5-(N-methylsulfamyl)-benzoic acid

The product from Procedure VII was added to 2 liters of 40% aqueous methylamine, stirred 3 hours and filtered. The filtrate was acidified and the solid fitered and dried to give 340 gm. 2,4-dichloro-5-(N-methylsulfamyl)-benzoic acid, m.p. 185–90°.

Procedure IX
Preparation of 2-benzylamino-4-chloro-5-(N-methylsulfamyl)-benzoic acid 2,4-Dichloro-5-(N-methylsulfamyl)-benzoic acid (50 gm.) and 130 ml. benzylamine were heated to 160°, then kept 1 hour at 150°, 1 hour at 130° and 1 hour at 90°. The reaction mixture was added to 400 ml. water and acidified to pH 3–5. The solid was filtered, heated with 400 ml. alcohol and cooled to give 32 gm. 2-benzylamino-4-chloro-5-(N-methylsulfamyl)-benzoic acid.

Procedure X
Preparation of 1-Benzyl-6-(N-methylsulfamyl)-7-chloro-isatoic anhydride 2Benzylamino-4-chloro-5-(N-methylsulfamyl)-benzoic acid (44 gm.), 460 ml. acetic acid, and 25 ml. phosgene were stirred overnight. The solid was filtered, washed with isopropanol and then with ether to give 38 gm. 1-benzyl-6-(N-methylsulfamyl)-7-chloro-isatoic anhydride, m.p. 234–6.

Procedure XI
Preparation of 2-Benzylamino-4-chloro-5-(N- methylsulfamyl)-N-(o-tolyl)-benzamide

1-Benzyl-6-(N-methylsulfamyl)-7-chloroisatoic anhydride (38 gm.) and 200 ml. o-toluidine were heated to 170°, kept 5 minutes at 170–80°, cooled and 800 ml. ether added. The solid was filtered to give 22 gm. 2-benzylamino-4-chloro-5-(N-methylsulfamyl)-N-(o-tolyl)-benzamide, m.p. 225–7.

Procedure XII

Preparation of 2-amino-4-chloro-5-sulfamyl-N-(p-chlorophenyl)-benzamide

4-Chloro-5-sulfamylisatoic anhdride (10 gm.), 10 gm. p-chloroaniline and 50 ml. pyridine were heated 15 minutes at 110–12° under nitrogen, cooled 5 minutes and poured into 500 ml. ice water. The solid was filtered and recrystallized from a mixture of 350 ml. alcohol and 150 ml. water to give 9 gm. 2-amino-4-chloro-5-sulfamyl-N-(p-chlorophenyl)-benzamide.

Procedure XIII

Preparation of 2-amino-4-chloro-5-sulfamyl-N-phenylbenzamide

7-Chloro-6-sulfamylisatoic anhydride (VI) (51 gm.) and 300 ml. aniline were heated, under nitrogen, to 175°. The temperature was kept at 175° for 5 minutes and the reaction mixture cooled to room temperature. Ether (300 ml.) was added and the solid filtered to give 40 gm. crude product. This, plus a second crop of 3 gm., was recrystallized from a mixture of 75 ml. dimethylformamide and 60 ml. water to give 33.5 gm. of 2-amino-4-chloro-5-sulfamyl-N-phenylbenzamide, m.p. 227–30. A second crop of 5.7 gm. was obtained from the mother liquor.

Procedure XIV

Preparation of 2-Amino-4-chloro-5-sulfamyl-N-(o-methylbenzyl)-benzamide

6-Sulfamyl-7-chloroisatoic anhydride (20 gm.), 2-methylbenzylamine (9 gm.) and 200 ml. pyridine were refluxed 20 minutes and cooled for 1 hour, then poured into 2 liters of ice water. The solid was filtered, sucked dry, heated with 1 liter of alcohol, and filtered to give (alcohol insoluble) 19.5 gm. 2-amino-4-chloro-5-sulfamyl-N-(o-methylbenzyl)-benz-amide, m.p. 275–8.

Procedure XV

Preparation of 2-Amino-4-chloro-5-sulfamyl-N-benzyl-benzamide

7-Chloro-6-sulfamylisatoic anhydride (41.5 gm.) was added to a solution of 41 ml. benzylamine in 350 ml. water and stirred for 2 hours. The solid was filtered, washed and recrystallized from a mixture of 100 ml. dimethylformamide and 80 ml. water to give 31.8 gm. 2-amino-4-chloro-5-sulfamyl-N-benzylbenzamide.

Procedure XVI

Preparation of 2,4-Dichloro-5-sulfamylbenzoic acid 2,4-Dichlorobenzoic acid (800 gm.) was added to 4 kg. chlorosulfonic acid, the mixture refluxed 1½ hours, cooled to 30° and added to 8 kg. ice. The solid was filtered and washed with water. The wet solid was added to 8 liters of 28% ammonia precooled to 0° and the solution filtered to clarify it. The solution was allowed to stand 2 hours, acidified with hydrochloric acid, cooled and filtered. The solid was filtered, washed and dried to give 790 gm. crude product which was recrystallized from 5 liters of water to give 471 gm. of 2,4-dichloro-5-sulfamylbenzoic acid, m.p. 225–8°.

Procedure XVII

Preparation of 4-Chloro-5Sulfamyl-N-methylanthranilic acid 2,4-Dichloro-5-sulfamylbenzoic acid in 800 ml. 10% aqueous methylamine was heated at 125–30° for 5 hours in a pressure reactor. The reaction mixture was cooled, acidified with hydrochloric acid, filtered, and the solid washed with water and air dried. The crude product was refluxed with 1,050 m. 50% ethanol, the solution treated with charcoal and filtered. To the filtrate was added 445 ml. hot water and the mixture allowed to cool to give 40 gm. 4-chloro-5-sulfamyl-N-methylanthranilic acid, m.p. 254–6.

Procedure XVIII

Preparation of 1-Methyl-6-sulfamyl-7-chloroisatoic anhydride

A solution of 40 ml. phosgene in 160 ml. acetic acid was added to a mixture of 39 gm. 4-chloro-5-sulfamyl-N-methyl-anthranilic acid and 400 ml. acetic acid. The mixture was stirred 4 hours and filtered. The solid was washed with a little acetic acid and then with ether to give 39 gm. 1-methyl- 6-sulfamyl-7-chloroisatoic anhydride, m.p. 292–6.

Procedure XIX

Preparation of 2-Methylamino-4-chloro-5-sulfamyl-N-(o-tolyl)-benzamide

1-Methyl-6-sulfamyl-7-chloroisatoic anhydride (7.3 gm.) 15 gm. o-toluidine, and 50 ml. pyridine were heated rapidly to reflux and refluxed for 10 minutes. The reaction mixture was allowed to cool for one-half hour and poured into 600 ml. of dilute HCl and ice. The solid was fltered and washed with water then stirred 1 hour with 75 ml. isopropanol and filtered. The solid was washed successively with isopropanol, 8% ammonia, isopropanol, ether and dried and then recrystallized from a mixture of 10 ml. dimethylformamide and 6 ml. water to give 3.5 gm. 2-methylamino-4-chloro-5-sulfamyl-N-(o-tolyl)-benzamide, m.p.275–5.

Procedure XX

Preparation of 4-Chloro-5-sulfamyl-N-benzyl anthranilic acid

To 500 ml. benzylamine was added 270 gm. 2,4-dichloro-5-sulfamyl benzoic acid, using a 2 liter 3 necked flask. Temperature was quickly raised to 130°C., maintained 1 hour, then cooled to 100°C. Reaction mixture was poured into 5 liters of ice water, acidified with 400 ml. HCl, stirred 4 hours, then filtered. The solid was recrystallized from 1 liter of 95% ethanol. Solid which separated on cooling was filtered off, air dried, Wt. = 192 gm., m.p. 242–6°C. (d).

Procedure XXI

Preparation of 4-Benzyl-6-chloro-7-sulfamyl isatoic anhydride

To 400 ml. acetic acid (glacial) was added 35.0 gm. 4-chloro-5-sulfamyl-N-benzyl anthranilic acid and 15 ml. phosgene. Reaction mixture was stirred for 24 hours, then the solid was filtered off, ether washed and air dried. Wt. = 25.2 g., color white.

Procedure XXII

Preparation of 2-Benzylamino-4-chloro-5-sulfamyl-N-(o-tolyl)-benzamide

25 Gm. of 4-benzyl-6-chloro-7-sulfamyl isatoic anhydried was added to 300 ml. o-toluidine at room temperature. Reaction mixture was quickly warmed to 190°C., maintained 5 minutes then allowed to cool. Cooled reaction mixture (50°C.) was poured into 3 liters ether. On standing, needles formed which were filtered, washed and dried.

Procedure XXIII
Preparation of 2-Amino-4-chloro-5-sulfamyl-N-(4-hydroxy-2-methylphenyl)-benzamide 7-Chloro-6-sulfamylisatoic anhydride (39.2 gm.) and 43 gm. 4-amino-3-methylphenol were added to 140 ml. pyridine and the mixture refluxed for 10 minutes, cooled to 40° and poured into 800 ml. hydrochloric acid and 1,500 ml. ice. The solid was filtered and washed with water. Additional solid came out of the filtrate after 24 hours. The solids were stirred separately with enough isopropanol to make a thin paste and filtered and washed to give 15 gm., m.p. 283-6 and 21.2 gm., m.p. 287-9 of 2-amino-4-chloro-5-sulfamyl-N-(4-hydroxy-2-methylphenyl)benzamide.

Procedure XXIV
Preparation of 2-Amino-4-chloro-5-sulfamyl-N-(o-ethylphenyl)-benzamide 7-Chloro-6-sulfamylisatoic anhydride (50 gm.) and o-ethylaniline (300 ml.) were heated rapidly to 155°, the temperature maintained for 5 minutes and the reaction allowed to cool to 30°. Ether (300 ml.) was added and the mixture stirred 30 minutes. The solid was filtered, washed with ether and isopropanol, refluxed with 400 ml. absolute methanol and filtered while hot to give 29.5 gm. of 2-amino-4-chloro-5-sulfamyl-N-(o-ethylphenyl)benzamide, m.p. 260-2.

Procedure XXV
Preparation of 2-Amino-4-chloro-5-sulfamyl-N-(2,4,5-trimethyl-phenyl)benzamide 7-Chloro-6-sulfamylisatoic anhydride (50 gm.) and 54 gm. 2,4,5-trimethylaniline were suspended in 200 ml. pyridine and heated 5 minutes at 115°. The mixture was cooled one-half hour and poured into a mixture of 1500 ml. ice and water containing 200 ml. concentrated hydrochloric acid. The solid was filtered and suspended in 1 liter of dilute $NH_4OH$ for one-half hour. The solid was filtered, sucked dry, and stirred with 250 ml. ab-solute methanol, then filtered and dried. A second crop was obtained from the filtrate. Combined solids were recrystallized from a mixture of 100 ml. dimethylformamide and 100 ml. water to give 23 gm. of 2-amino-4-chloro-5-sulfamyl-N-(2,4,5-tri-methylphenyl)benzamide, m.p. 278-87.

Procedure XXVI
Preparation of 2-Amino-4-chloro-5-sulfamyl-N-(p-tolyl)benzamide

7-Chloro-6-sulfamyl isatoic anhydride (17 gm.) was heated with 100 gm. p-toluidine to 175°. After 5 minutes at 175°, the reaction mixture was allowed to cool to 50°. Ether (100 ml.) was added and the solid filtered, washed and dried to give 16.6 gm. crude 2-amino-4-chloro-5-sulfamyl-N-(p-tolyl)-benzamide. The product was dissolved in 35 ml. dimethylformamide and 29 ml. water added. The solution was heated to 100° and cooled to give 15.8 gm. solid, m.p. 260.5-3.5.

Procedure XXVII
Preparation of 2-Amino-4-chloro-5-sulfamyl-N-(4-methoxy-2-methylphenyl)benzamide 7-Chloro-6-sulfamylisatoic anhydride (27.7 gm.), 41 gm. 4-methoxy-2-methylaniline, and 100 ml. pyridine were mixed at room temperature and then heated to reflux. The mixture was refluxed 10 minutes, cooled to 40° and poured into a mixture of ice and concentrated hydrochloric acid. The solid was filtered and washed successively with water, 5% ammonia, water, isopropanol, and ether. The dried solid was recrystallized from a mixture of 50 ml. dimethylformamide and 32 ml. water to give 17.6 gm. of 2-amino-4-chloro-5-sulfamyl-N-(4-methoxy-2-methylphenyl)benzamide, m.p. 229-30.

Procedure XXVIII
Preparation of 4-Chloro-5-sulfamyl-N-(p-sulfamylphenyl)-an-thranilamide 7-Chloro-6-sulfamylisatoic anhydride (5 gm.) was added to 30 gm. p-amino-benzenesulfonamide at 190-200° under an atmosphere of $SO_2$. When the reaction mixture became clear it was poured into 3 liters of water at 90°. The solution was cooled and the solid filtered and purified by chromatography on silica to give 4-chloro-5-sulfamyl-N-(p-sulfamylphenyl)-anthranilamide, m.p. 307-8.

Procedure XXIX
Preparation of 2-Amino-4-chloro-5-sulfamyl-N-(m-tolyl)benzamide

7-Chloro-6-sulfamylisatoic anhydride (20 gm.) and 120 ml. m-toluidine were heated 3 minutes at 165° and cooled to 50°. Ether was added and the solid filtered, washed with alcohol and then ether and dried under vacuum to give 19.1 gm. of 2-amino-4-chloro-5-sulfamyl-N-(m-tolyl)benzamide, m.p. 274-7.

Procedure XXX
Preparation of 2-benzylamino-4-chloro-5-(N,N-dimethylsulfamyl)-N-(o-tolyl)benzamide a. 2,4-Dichlorobenzoic acid (200 gm.) was added over 10 minutes to 1 kg. chlorosulfonic acid. The mixture was stirred 4 hours at 160°, and added to a mixture of ice and water. The solid was filtered, washed with water and sucked as dry as possible. The product (2,4-dichloro-5-carboxybenzene-sulfonyl chloride) was used in the next step without further purification.

b. 2,4-Dichloro-5-carboxy-benzenesulfonyl chloride (112 gm.) was stirred 4 hours with 800 ml. water and 100 gm. dimethylamine. The solid was filtered and recrystallized from water to give 76 gm. of 2,4-dichloro-5-(N,N-dimethylsulfamyl)-benzoic acid, m.p. 176-8°.

| | | |
|---|---|---|
| Calcd. | Cl - 23.78 | S - 10.75 |
| Found | 24.24 | 10.77 | c. 2,4-Dichloro-5-(N,N-dimethylsulfamyl)-benzoic acid (70 gm.) and 100 ml. thionyl chloride were refluxed 4½ hours and concentrated to dryness at 40°. The residue, 2,4-dichloro-5-dimethylsulfamyl-benzoyl chloride, was used without further purification.

d. 2,4-Dichloro-5-(N,N-dimethylsulfamyl)-benzoyl chloride (70 gm.) was added in portions to 500 ml. o-toluidine. The mixture was stirred 30 minutes, heated to 120° and poured into 2 liters of ice water. Hydrochloric acid was added to acidify and the solid filtered and washed successively with water, isopropanol, isopropanol-ether, and ether to give 63.5 gm. of 2,4-dichloro-5-(N,N-dimethylsulfamyl)-N-(o-tolyl)-benzamide, m.p. 182-3°.

e. To 100 ml. benzylamine was added 25.0 gm. of 2,4-dichloro-5-(N,N-dimethylsulfamyl)-N-(o-tolyl)-benzamide. Reaction was warmed gently to 120°C. and maintained four hours. Added reaction mixture to 400 ml. water, acidified. The solid was filtered off, recrystallized from 200 ml. 95% ethanol. Wt. = 14.2 gm. of 2-benzylamino-4-chloro-5-(N,N-dimethylsulfamyl)-N-(o-tolyl)-benzamide, m.p. 233-5°C., color white.

Procedure XXXI
Preparation of 2-Amino-4-chloro-5-(N,N-dimethylsulfamyl)-N-(o-tolyl)benzamide 2-Benzylamino-4-chloro-5-(N,N-dimethylsulfamyl)-

N-(o-tolyl)-benzamide (12 gm.) in 120 ml. dimethylformamide was reduced catalytically at 60 p.s.i. with 4 gm. of 5% Pd/C. The mixture was diluted with 100 ml. tetrahydrofuran and filtered. The filtrate was concentrated to 70 ml., poured into 600 ml. water, and the solid filtered and recrystallized from 200 ml. alcohol to give 5.6 gm. of 2-amino-4-chloro-5-(N,N-dimethylsulfamyl)-N-(o-tolyl)-benzamide, m.p. 176–7°. Concentration of the filtrate gave a second crop of 3.1 gm.

The following examples detail the preparation of representative compounds of this invention.

EXAMPLE 1

Preparation of 2-Methyl-3-(o-tolyl)-6-sulfamyl-7-chloro-1,2,3,4-tetrahydro-4-quinezolinone VIII 2-Amino-4-chloro-5-sulfamyl-N-(o-tolyl)-benzamide (685 gm.)(Procedure VI) was slurried in 700 ml. glacial acetic acid. To this slurry was added 240 gm. (280 ml.) dimethyl acetal and 4 ml. concentrated sulfuric acid. The reaction mixture was stirred for 3½ hours, then filtered and washed thoroughly with ether. The yield of crude material was 664 gm. and it melted at 252–253°. This was recrystallized from 25 liters of 95% ethanol by dissolving hot, cooling, and concentrating to half volume under reduced pressure at 30°. Weight of the first crop = 685 gm., m.p. 246–250° (240–243°).

|  | C | H | N Analysis: |
|---|---|---|---|
| Calcd. for C$_{16}$H$_{16}$ClN$_3$O$_3$S; | 52.53 | 4.41 | 11.49 |
| Found: | 52.38 | 4.45 | 11.53 |
|  | Cl |  | S |
|  | 9.69 |  | 8.76 |
|  | 9.70 |  | 8.90 |

The filtrates from the recrystallization were concentrated down to half volume and a further 251 gm. product was obtained. Concentration of this filtrate to half volume gave another 196 gm. product which was recrystallized again from 4,500 ml. 95% ethanol by concentration to half volume at 30° under vacuum, yielding 151 gm. of product. This portion was combined with the 251 gm. portion obtained above. Total weight: 402 gm., m.p. 247–252° (227.5–231.5°)
Analysis:

|  | C | H | N | Cl | S |
|---|---|---|---|---|---|
| Calcd. for C$_{16}$H$_{16}$ClN$_3$O$_3$S: | 52.53 | 4.41 | 11.49 | 9.69 | 8.76 |
| Found: | 52.38 | 4.47 | 11.74 | 9.70 | 9.05 |

EXAMPLE 2

Preparation of 3-(o-Tolyl)-6-sulfamyl-7-chloro-1,2,3,4-tetrahydro-4-quinazolinone Dimethoxymethane (11.3 ml.) was added dropwise over 5 minutes to a mixture of 40.8 gm. 2-amino-4-chloro-5-sulf-amyl-N-(o-tolyl)-benzamide. (Procedure VI) 400 ml. acetic acid, and 12 ml. sulfuric acid. The mixture was stirred 6 hours, poured into 3.5 liters of water and the solid filtered and washed with water. The dried solid was purified by chromatography on silica to give 24.2 gm. product which was recrystallized twice from alcohol (800 and 600 ml.) to give 15 gm. of product. m.p. 250–3.5.

|  | C | H | Cl | N |
|---|---|---|---|---|
| Calcd.: | 51.21 | 4.01 | 10.08 | 11.94 |
| Found: | 51.27 | 3.95 | 9.86 | 12.21 |
|  |  |  | 10.08 |  |

EXAMPLE 3

Preparation of 2-Ethyl-3-(o-tolyl)-6-sulfamyl-7-chloro-1,2,3,4-tetrahydro-4-quinazolinone 2-Amino-4-chloro-5-sulfamyl-N-(o-tolyl)-benzamide-(o-tolyl)-benzamide (Procedure VI) (12 gm.), 125 ml. propionic acid, and 7 gm. propionaldehyde were stirred under nitrogen. Concentrated sulfuric acid (6 drops) was added and the mixture stirred 1½ hours at room temperature. Ether (100 ml.) was added and an oil separated which solidified on further stirring. The liquid was decanted and the solid boiled one-half hour with 125 ml. ethyl acetate and filtered. The filtrate was cooled to give 10.2 gm. product which was recrystallized from 250 ml. alcohol to give 9 gm. of 2-ethyl-3-(o-tolyl)-6-sulfamyl-7-chloro-1,2,3,4-tetrahydro-4-quinazolinone, m.p. 238-40.

|  | C | H | N | Cl | S |
|---|---|---|---|---|---|
| Calcd: | 53.75 | 4.78 | 11.06 | 9.33 | 8.44 |
| Found: | 53.61 | 4.91 | 11.00 | 9.47 | 8.48 |

EXAMPLE 4

Preparation of 1-Benzyl-2-methyl-3-(o-tolyl)-6-(N-methylsulf-amyl)-7-chloro-1,2,3,4-tetrahydro-4-quinazolinone 2-Benzylamino-4-chloro-5-(N-methylsulfamyl)-N-(o-tolyl)-benzamide (Procedure XI) (7.5 gm.) was added to 25 ml. acetic acid. 1,1-Dimethoxyethane (7 gm.) was added and the mixture heated to 100°. Sulfuric acid (2 drops) was added and the mixture stirred without heat for 1½ hours. The solid was filtered, washed with ether and dried at 100° to give 7.5 gm. 1-benzyl-2-methyl-3-(o-tolyl)-6-(N-methylsulfamyl)-7-chloro-1,2,3,4-tetrahydro-4-quinazolinone, m.p. 255-8.

|  | C | H | N | Cl | S |
|---|---|---|---|---|---|
| Calcd: | 61.33 | 5.15 | 8.94 | 7.54 | 6.82 |
| Found: | 61.17 | 5.27 | 9.01 | 7.64 | 6.79 |

EXAMPLE 5

Preparation of 2-Methyl-3-(o-tolyl)-6-(N-methylsulfamyl)-7-chloro-1,2,3,4-tetrahydro-4-quinazolinone 1-Benzyl-2-methyl-3-(o-tolyl)-6-(N-methylsulfamyl)-7-chloro-1,2,3,4-tetrahydro-4-quinazolinone (3 gm.) in 60 ml. methanol was reduced catalytically at 60 p.s.i. using 3 gm. 5% Pd-C catalyst. The reaction mixture was diluted with 100 ml. tetrahydrofuran and filtered. The filtrate was concentrated to give a solid which was stirred with 50 ml. alcohol and filtered to give 1.4 gm. 2-methyl-3-(o-tolyl)-6-(N-methyl-sulfamyl)-7-chloro-1,2,3,4-tetrahydro-4-quinazolinone, m.p. 163–5.

|  | C | H | N |
|---|---|---|---|
| Calcd: | 53.75 | 4.80 | 11.06 |
| Found: | 53.42 | 5.05 | 10.83 |

EXAMPLE 6

Preparation of 2-Methyl-3-(p-chlorophenyl)-6-sulfamyl-7-chloro-1,2,3,4-tetrahydro-4-quinazolinone 2-Amino-4-chloro-5-sulfamyl-N-(p-chlorophenyl)-benzamide (Procedure XII) (9 gm.) was suspended in 120 ml. acetic acid. 2,2-Dimethoxyethane (8 gm.) was added, then 1 ml. sulfuric acid. The reaction mixture 2-Amino-4-chloro-5-sulfamyl-N-(o-tolyl)-benzamide (Procedure VI) (34 gm.) in 350 ml. acetic acid was heated to 100° under nitrogen and 25 ml. ethylthioacetaldehyde diethylacetal was added. After 2 minutes 5 ml. sulfuric acid was added. The mixture was stirred 1–2 minutes and poured into 2 liters of crushed ice. The solid was filtered, washed with water and dried. The crude product was recrystallized from 140 ml. alcohol to give 18.1 gm. 2-ethylthiomethyl-3-(o-tolyl)-6-sulfamyl-7-chloro-1,2,3,4-tetrahydro-4-quinazolinone, m.p. 135–7°.

|  | C | H | N | Cl | S |
|---|---|---|---|---|---|
| Calcd: | 50.76 | 4.73 | 9.86 | 8.32 | 15.05 |
| Found: | 50.47 | 4.63 | 9.95 | 8.38 | 14.84 |

EXAMPLE 14

Preparation of 2-Dichlromethyl-3-(o-tolyl)-6-sulfamyl-7-chloro-1,2,3,4-tetrahydro-4-quinazolinone 2-Amino-4-chloro-5-sulfamyl-N-(o-tolyl)-benzamide (Procedure VI) (15 gm.), 1,1-dichloro-2,2-diethoxyethane (10 gm.), acetic acid (50 ml.) and sulfuric acid (1 ml.) were heated 5 minutes at 115° under nitrogen. The mixture was cooled below 40° and 50 ml. ether added. The solid was filtered and dissolved in 150 ml. hot ethyl acetate. The solution was cooled, 25 ml. ether added and the solid filtered. Another addition of 25 ml. ether to the filtrate gave a third crop of product. Combined crops 1, 2 and 3 to give 15.6 gm. of 2-dichloromethyl-3-(o-tolyl)-6-sulfamyl-7-chloro-1,2,3,4-tetrahydro-4-quinazolinone, m.p. 193–5.

|  | C | H | N | Cl | S |
|---|---|---|---|---|---|
| Calcd: | 44.21 | 3.25 | 9.67 | 24.47 | 7.38 |
| Found: | 44.02 | 3.18 | 9.88 | 24.97 | 7.35 |
|  | 43.73 | 3.19 | 9.69 | 24.18 | 7.47 |
|  |  |  |  | 24.54 |  |
|  |  |  |  | 24.38 |  |

EXAMPLE 15

Preparation of 2-Benzyl-3-(o-tolyl)-6-sulfamyl-7-chloro-1,2,3,4-tetrahydro-4-quinazolinone Phenylacetaldehyde dimethylacetal (9.6 gm.) was added to a mixture of 17 gm. 2-amino-4-chloro-5-sulfamyl-N-(o-tolyl)-benzamide (Procedure VI) and 175 ml. acetic acid. Sulfuric acid (30 drops) were added and the mixture stirred overnight. The solid was filtered, washed with acetic acid, then with ether, and recrystallized four times from alcohol to give 5.6 gm. of product, m.p. 247.5–51.5°.

|  | C | H | N | Cl | S |
|---|---|---|---|---|---|
| Calcd: | 59.79 | 4.56 | 9.51 | 8.02 | 7.26 |
| Found: | 59.74 | 4.51 | 9.79 | 7.93 | 6.99 |

EXAMPLE 16

Preparation of 2-Methyl-3-benzyl-6-sulfamyl-7-chloro-1,2,3,4-tetrahydro-4-quinazolinone To 2-amino-4-chloro-5-sulfamyl-N-benzylbenzamide (Procedure XV) (34 gm.) in 250 ml. acetic acid was added 12.2 ml. 1,1-dimethoxyethane and then 50 drops of sulfuric acid. The mixture was stirred 4 hours, poured into 3 liters of water and filtered. The solid was refluxed with 30 ml. alcohol, cooled to room temperature and filtered to give 25 gm. product. This was recrystallized 3 times from alcohol to give 12.7 gm. of 2-methyl-3-benzyl-6-sulfamyl-7-chloro-1,2,3,4-tetrahydro-4-quinazolinone, m.p. 216–18.

|  | C | H | Cl | N | S |
|---|---|---|---|---|---|
| Calcd: | 52.53 | 4.41 | 9.69 | 11.49 | 8.76 |
| Found: | 52.25 | 4.28 | 9.64 | 11.27 | 8.85 |

EXAMPLE 17

Preparation of Monosodium 2-methyl-3-(o-tolyl)-6-sulfamyl-7-chloro-1,2,3,4-tetrahydro-4-quinazolinone dihydrate 2-Methyl-3-(o-tolyl)-6-sulfamyl-7-chloro-1,2,3,4-quinazolinone (36.6 gm.) was dissolved in a solution of 4.4 gm. sodium hydroxide in 250 ml. alcohol. The solution was filtered, heated to 35°, and 150 ml. ether added. The solid was filtered and recrystallized twice from a mixture of alcohol and ether to give 27 gm. of product, m.p. 227–30.

|  | C | H | Cl | N | S | Na | H₂O |
|---|---|---|---|---|---|---|---|
| Calculated | 45.34 | 4.52 | 8.36 | 9.91 | 7.56 | 5.42 |  |
| Found | 45.50 | 4.76 | 8.51 | 9.86 | 7.26 | 5.96 | 8.9 |

EXAMPLE 18

Preparation of 2-Cyclobutyl-3-(o-tolyl)-6-sulfamyl-7-chloro-1,2,3,4-tetrahydro-4-quinazolinone 2-Amino-4-chloro-5-sulfamyl-N-(o-tolyl)-benzamide (Procedure VI) (12 gm.) was suspended in 200 ml. acetic acid and 8 gm. cyclobutane carboxaldehyde added. The mixture was heated to 95°, 3 ml. sulfuric acid added, and the temperature kept at 95° for one-half hour. The reaction mixture was poured into ice water (2 liters) and filtered. The crude product was recrystallized from 300 ml. alcohol to give 9 gm., m.p. 238–40.

|  | C | H | N | Cl | S |
|---|---|---|---|---|---|
| Caldc.: | 56.22 | 4.97 | 10.35 | 8.73 | 7.90 |
|  | 56.14 | 5.07 | 10.42 | 8.82 | 7.96 |
|  |  |  |  | 9.02 |  |

EXAMPLE 19

Preparation of 2-Phenyl-3-(o-tolyl)-6-sulfamyl-7-chloro-1,2,3,4-tetrahydro-4-quinazolinone 2-Amino-4-chloro-5-sulfamyl-N-(o-tolyl)-benzamide (Procedure VI) (10 gm.), benzaldehyde (6 gm.), acetic acid (120 ml.), and 5 drops of sulfuric acid were stirred 2 hours at room temperature and filtered. The filtrate was concentrated to dryness and the residue recrystallized from 600 ml. ethyl acetate-hexane (4:1) to give 5.9 gm. of 2-phenyl-3-(o-tolyl)-6-sulfamyl-7-chloro-1,2,3,4-tetrahydro-4-quinazolinone, m.p. 241–3°.

|  | C | H | N | S | Cl |
|---|---|---|---|---|---|
| Caldc: | 58.94 | 4.24 | 9.82 | 7.49 | 8.29 |
| Found: | 58.80 | 4.24 | 9.89 | 7.52 | 8.40 |

EXAMPLE 20

Preparation of 1,2-Dimethyl-3-(o-tolyl)-6-sulfamyl-7-chloro-1,2,3,4-tetrahydro-4-quinazolinone 2-Methylamino-4-chloro-5-sulfamyl-N-(o-tolyl)-benzamide (Procedure XIX) (18.5 gm.) was added to 200 ml. acetic acid. To the mixture was added 16 ml. 1,1-dimethoxyethane and 0.5 ml. sulfuric acid. The reaction was stirred one-half hour, filtered and stirred another 1½ hours. The solid was filtered and washed with acetic acid and then with ether to give 17.6 gm. of 1,2-dimethyl-3-(o-tolyl)-6-sulfamyl-7-chloro-1,2,3,4-tetrahydro-4-quinazolinone, m.p. 261–3.

was warmed until solution occurred and then poured into 700 ml. water. The solid was filtered and recrystallized from 850 ml. alcohol to give 4.6 gm. 2-methyl-3-(p-chlorophenyl)-6-sulfamyl-7-chloro-1,2,3,4-tetrahydro-4-quinazolinone, m.p. 316–18.

|  | C | H | N | Cl |
|---|---|---|---|---|
| Calcd: | 46.64 | 3.39 | 10.88 | 18.36 |
| Found | 46.55 | 3.43 | 10.89 | 18.06 |
|  |  |  |  | 18.07 |

EXAMPLE 7

Preparation of 2-Methyl-3-phenyl-6-sulfamyl-7-chloro-1,2,3,4-tetrahydro-4-quinazolinone To a mixture of 39.2 gm. 2-amino-4-chloro-5-sulfamyl-N-phenylbenzamide (Procedure XIII) 400 ml. acetic acid, and 16.2 ml. 1,1-dimethoxyethane was added 0.2 ml. sulfuric acid. The reaction mixture was stirred 5 hours at room temperature and the solid filtered and washed with 75 ml. acetic acid, then with ether to give 42.2 gm. crude product. This was recrystallized twice from alcohol (2 liters and 1.4 liters) and dried at 110° to give 22 gm. of 2-methyl-3-phenyl-6-sulfamyl-7-chloro-1,2,3,4-tetrahydro-4-quinazolinone, m.p. 247.5–50 (sol-vated). The final product was dried at 130–40° for 18 hours over $P_2O_5$ and under vacuum to give a product melting at 245.5–9°.

|  | C | H | Cl | N | S |
|---|---|---|---|---|---|
| Calcd: | 51.21 | 4.01 | 10.08 | 11.94 | 9.11 |
| Found: | 51.12 | 4.00 | 10.35 | 11.91 | 9.39 |

EXAMPLE 8

Preparation of 2-Methyl-3-(o-methylbenzyl)-6-sulfamyl-7-chloro-1,2,3,4-tetrahydro-4-quinazolinone 2-Amino-4-chloro-5-sulfamyl-N-(o-methylbenzyl)-benzamide (Procedure XIV) (12 gm.), 2,2-dimethoxyethane (10 gm.) and 200 ml. acetic acid were heated to 80° and 5 ml. sulfuric acid added dropwise. After 5 minutes at 80° to mixture was poured into 500 ml. ice water and filtered. The solid was recrystallized from 300 ml. alcohol to give 5.4 gm. of 2-methyl-3-(o-methylbenzyl)-6sulfamyl-7-chloro-1,2,3,4-tetrahydro-4-quinazolinone, m.p. 234–5.

|  | C | H | N | Cl | S |
|---|---|---|---|---|---|
| Calcd: | 53.75 | 4.78 | 11.06 | 9.33 | 8.44 |
| Found: | 53.57 | 4.92 | 11.26 | 9.36 | 8.21 |

EXAMPLE 9

Preparation of 2-Propyl-3-(o-tolyl)-6-sulfamyl-7-chloro-1,2,3,4-tetrahydro-4-quinazolinone 2-Amino-4-chloro-5-sulfamyl-N-(o-tolyl)-benzamide (Procedure VI) (10 gm.), acetic acid (60 ml.), butyraldehyde (8 gm.) and 8 drops sulfuric acid were stirred 5 minutes. The mixture was poured into 1 liter of water and filtered. The solid was recrystallized from alcohol to give 8.1 gm. of product which was combined with 11.4 gm. from another batch and recrystallized from alcohol and then from acetic acid to give 6.2 gm. of product, m.p. 221–4°.

|  | C | H | N | Cl | S |
|---|---|---|---|---|---|
| Calcd: | 54.88 | 5.12 | 10.67 | 9.00 | 8.14 |
| Found: | 54.74 | 5.22 | 10.94 | 9.02 | 8.14 |
|  |  |  |  | 9.06 |  |

EXAMPLE 10

Preparation of 2-Butyl-3-(o-tolyl)-6-sulfamyl-7-chloro-1,2,3,4-tetrahydro-4-quinazolinone To 2-Amino-4-chloro-5-sulfamyl-N-(o-tolyl)-benzamide (Procedure VI) (23.7 gm.) in 250 ml. acetic acid was added 13.46 gm. 1,1-diethoxypentane and then 70 drops of sulfuric acid. The mixture was stirred 6 hours, poured into 2 liters of water and the solid filtered and dried. The crude product was recrystallized from 300 ml. benzene, twice from isopropanol (200 and 125 ml.), then purified by chromatography on silica. The solid was then recrystallized from a mixture of tetrahydrofuran (50 ml.) and benzene (200 ml.) to give 14.7 gm. of product, m.p. 145–53°.

|  | C | H | Cl | N |
|---|---|---|---|---|
| Calcd: | 55.95 | 5.44 | 8.69 | 10.30 |
| Found: | 56.21 | 5.45 | 8.54 | 10.11 |
|  |  |  | 8.48 |  |

EXAMPLE 11

Preparation of 2-Benzylthiomethyl-3-(o-tolyl)-6-sulfamyl-7-chloro-1,2,3,4-tetrahydro-4-quinazolinone 2-Amino-4-chloro-5-sulfamyl-N-(o-tolyl)-benzamide (Procedure VI) (34 gm.) was slurried in 350 ml. acetic acid and heated to 100° under nitrogen. Benzylthioacetaldehyde diethylacetal (37 ml.) was added followed by 5 ml. sulfuric acid. The mixture was stirred 1 minute and poured into 2 liters of crushed ice. The solid was filtered, washed with water and dried. The crude product was recrystallized from 500 ml. ethyl acetate and then from 90 ml. methoxyethanol to give 26.6 gm. of 2-benzylthiomethyl-3-(o-tolyl)-6-sulfamyl-7-chloro-1,2,3,4-tetrahydro-4-quinazolinone, m.p. 199–201°.

|  | C | H | N | Cl |
|---|---|---|---|---|
| Calcd: | 56.60 | 4.54 | 8.61 | 7.27 |
| Found: | 56.37 | 4.54 | 8.90 | 6.99 |

EXAMPLE 12

Preparation of 2-(2,2,2-Trifluoroethylthiomethyl)-3-(o-tolyl)-6-sulfamyl-7-chloro-1,2,3,4-tetrahydro-4-quinazolinone 2-Amino-4-chloro-5-sulfamyl-N-(o-tolyl)-benzamide (Procedure VI) (17 gm.) in 175 ml. acetic acid was heated to 100° and 14.7 gm. 2,2,2-trifluoroethylthioacetaldehyde diethylacetal was added. After 2 minutes 2 - 2 ml. sulfuric acid was added and the mixture heated for 1 minute and poured into 1 liter of ice and water. The solid was filtered, washed with water and dried. The crude product was recrystallized from 300 ml. chloroform, then dissolved in isopropanol and precipitated out with water to give 17 gm. of product, m.p. 148°. Analysis of the product showed 1.1% water.

|  | C | H | N | Cl | S | F |
|---|---|---|---|---|---|---|
| Calculated | 44.54 | 3.53 | 7.31 | 11.75 | 8.66 | 13.21 |
| Found | 44.78 | 3.54 | 7.54 | 12.51 | 8.70 | 13.25 |
|  |  |  |  | 12.35 |  |  |
|  |  |  |  | 11.27 |  |  |

EXAMPLE 13

Preparation of 2-Ethylthiomethyl-3-(o-tolyl)-6-sulfamyl-7-chloro-1,2,3,4-tetrahydro-4-quinazolinone

|        | C     | H    | Cl   | N     |
| ------ | ----- | ---- | ---- | ----- |
| Calcd: | 41.81 | 3.51 | 8.23 | 13.00 |
| Found: | 41.43 | 3.51 | 8.52 | 13.13 |

EXAMPLE 28

Preparation of 2-Methyl-3-(o-tolyl)-6-acetylsulfamyl-7-chloro-1,2,3,4-tetrahydro-4-quinazolinone 2-Methyl-3-(o-tolyl)-6-sulfamyl-7-chloro-1,2,3,4-tetrahydro-4-quinazolinone (25 gm.) was dissolved in 200 ml. pyridine. Acetic anhydride (62.5 ml.) was added and the mixture stirred 6 hours at room temperature. The solution was poured into 1,000 ml. ice and water and acidified with concentrated hydrochloric acid. After three-fourths hour, the solid was filtered, washed with water and recrystallized from a mixture of 50 ml. acetone and 40 ml. water and then dissolved in a mixture of 250 ml. acetone and 100 ml. water, filtered and concentrated to 200 ml. to give 17.1 gm. of product m.p. 243-6°.

|        | C     | H    | Cl   | N     | S    |
| ------ | ----- | ---- | ---- | ----- | ---- |
| Calcd: | 53.01 | 4.45 | 8.69 | 10.30 | 7.86 |
| Found: | 52.71 | 4.62 | 8.88 | 10.22 | 7.76 |

EXAMPLE 29

Preparation of 2-Chloromethyl-3-phenyl-6-sulfamyl-7-chloro-1,2,3,4-tetrahydro-4-quinazolinone 2-Amino-4-chloro-5-sulfamyl-N-(o-tolyl)-benzamide (Procedure VI) (18 gm.) and 200 ml. acetic acid were added to a toluene solution of cyclopentylacetaldehyde (prepared by catalytic reduction of 10 gm. cyclopentylacetyl chloride). The mixture was heated to 90–5° and 1 mol sulfuric acid added dropwise. The temperature was maintained for 1 hour and the reaction mixture poured into 2 liters of ice and water. The solid was filtered and recrystallized from butyl acetate to give 6 gm. of product, m.p. 134–5.

|        | C     | H    | N     | Cl    | S    |
| ------ | ----- | ---- | ----- | ----- | ---- |
| Calcd: | 46.64 | 3.39 | 10.88 | 18.36 | 8.30 |
| Found: | 46.51 | 3.38 | 10.81 | 18.36 | 8.37 |

EXAMPLE 30

Preparation of 2-Cyclopentylmethyl-3-(o-tolyl)-6-sulfamyl-7-chloro-1,2,3,4-tetrahydro-4-quinazolinone 2-Amino-4-chloro-5-sulfamyl-N-(o-tolyl)-benzamide (Procedure VI) (18 gm.) and 200 ml. acetic acid were added to a toluene solution of cyclopentylacetaldehyde (prepared by catalytic reduction of 10 gm. cyclopentylacetyl chloride). The mixture was heated to 90–5° and 1 mol sulfuric acid added dropwise. The temperature was maintained for 1 hour and the reaction mixture poured into 2 liters of ice and water. The solid was filtered and recrystallized from butyl acetate to give 6 gm. of product, m.p. 134–5.

|        | C     | H    | N    | Cl   | S    |
| ------ | ----- | ---- | ---- | ---- | ---- |
| Calcd: | 58.12 | 5.57 | 9.68 | 8.17 | 7.39 |
|        | 58.09 | 5.66 | 9.89 | 8.06 | 6.74 |

EXAMPLE 31

Preparation of 1-Benzyl-2-methyl-3-(o-tolyl)-6-sulfamyl-7-chloro-1,2,3,4-tetrahydro-4-quinazolinone To 2-Benzylamino-4-chloro-5-sulfamyl-N-(o-tolyl)-benzamide (Procedure XXII) (5.6 gm.) and 3 gm. 1,1-dimethoxyethane in 70 ml. acetic acid was added 4 drops of sulfuric acid over a 5 minute period. The mixture was stirred overnight and filtered. The solid was washed with ether and recrystallized from 60 ml. acetic acid to give 3.2 gm. of product, m.p. 191–2.

|        | C     | H    | N    | Cl   | S    |
| ------ | ----- | ---- | ---- | ---- | ---- |
| Calcd: | 60.59 | 4.86 | 9.22 | 7.78 | 7.03 |
| Found: | 60.45 | 4.99 | 9.33 | 7.62 | 6.94 |

EXAMPLE 32

Preparation of 2-Isopropyl-3-(o-tolyl)-6-sulfamyl-7-chloro-1,2,3,4-tetrahydro-4-quinazolinone To 2-amino-4-chloro-5-sulfamyl-N-(o-tolyl)-benzamide (Procedure VI) (51 gm.) in 520 ml. acetic acid was added 30.5 gm. isobutyraldehyde diethylacetal and then 140 drops of sulfuric acid. The mixture was stirred overnight at room temperature. The solid was filtered, washed with acetic acid, then with ether and recrystallized 4 times from alcohol. The product was dried at 135° under vacuum over $P_2O_5$ to give 18 gm., m.p. 222.5–36.

|        | C     | H    | Cl   | N     | S    |
| ------ | ----- | ---- | ---- | ----- | ---- |
| Calcd: | 54.89 | 5.12 | 9.00 | 10.67 | 8.14 |
| Found: | 54.83 | 5.17 | 9.01 | 10.62 | 8.08 |

EXAMPLE 33

Preparation of 2-Methyl-3-(m-tolyl)-6-sulfamyl-7-chloro-1,2,3,4-tetrahydro-4-quinazolinone 2-Amino-4-chloro-5-sulfamyl-N-(m-tolyl)-benzamide (Procedure XXIX) (10 gm.), 125 ml. propionic acid, 7 ml. dimethoxyethane, and 6 drops of sulfuric acid were stirred for 2 hours at room temperature. Ether was added to bring the volume to 250 ml. The liquid was decanted and the remaining solid was recrystallized from 125 ml. ethyl acetate to give 7 gm. of 2-methyl-3-(m-tolyl)-6-sulfamyl-7-chloro-1,2,3,4-tetrahydro-4-quinazolinone, m.p. 232-4.

|        | C     | H    | N     | Cl   |
| ------ | ----- | ---- | ----- | ---- |
| Calcd: | 52.53 | 4.41 | 11.49 | 9.69 |
| Found: | 52.58 | 4.40 | 11.64 | 9.81 |

EXAMPLE 34

Preparation of 2-Ethyl-3-(m-tolyl)-6-sulfamyl-7-chloro-1,2,3,4-tetrahydro-4-quinazolinone 2-Amino-4-chloro-5-sulfamyl-N-(m-tolyl)-benzamide (Procedure XXIX) (8 gm.) was added to 50 ml. ethanol saturated with HCl gas. Propionaldehyde (6 gm.) was added, the mixture stirred 3 hours and poured into 250 ml. water. The solid was filtered, dried and recrystallized from chloroform to give 4.2 gm. of 2-ethyl-3-(m-tolyl)-6-sulfamyl-7-chloro-1,2,3,4-tetrahydro-4-quinazolinone, m.p. 178-80.

|        | C     | H    | Cl   | N     | S    |
| ------ | ----- | ---- | ---- | ----- | ---- |
| Calcd: | 53.75 | 4.78 | 9.33 | 11.06 | 8.44 |
| Found: | 53.45 | 4.85 | 9.38 | 11.23 | 8.51 |

EXAMPLE 35

Preparation of 2-Chloromethyl-3-(o-tolyl)-6-sulfamyl-7-chloro-1,2,3,4-tetrahydro-4-quinazolinone 2-Amino-4-chloro-5-sulfamyl-N-(o-tolyl)-benzamide (Procedure VI) (25 gm.) was heated to 90° with 250 ml. acetic acid. Sulfuric acid (0.7 ml.) and 12.5 ml.

|        | C     | H    | N     | Cl   | S    |
|--------|-------|------|-------|------|------|
| Calcd: | 53.61 | 5.03 | 11.03 | 9.31 | 8.42 |
| Found: | 53.82 | 4.92 | 11.26 | 9.39 | 8.18 |

EXAMPLE 21

Preparation of 1-Benzyl-3-(o-tolyl)-6-sulfamyl-7-chloro-1,2,3,4-tetrahydro-4-quinazolinone To a heavy suspension of 5.3 gm. 2-benzylamino-4-chloro-5-sulfamyl-N-(o-tolyl)-benzamide (Procedure XXII) in acetic acid was added 3.0 gm. 1,1-dimethoxy methane, then 4 drops $H_2SO_4$ over 5.0 minutes (one drop every 1–2 minutes). A solution formed; on continued stirring overnight a solid had separated. The solid was filtered off, ether washed and dried. The product was recrystallized twice from glacial acetic acid - the material from the second recrystallization was dried at 150°C. for 72 hours. Wt. = 3.2 gm., m.p. 193–5°C, color white.

|                              | C     | H    | N    | Cl   | S    |
|------------------------------|-------|------|------|------|------|
| Calcd: $C_{23}H_{22}ClN_3O_3S$ | 60.59 | 4.86 | 9.22 | 7.78 | 7.03 |
| Found:                       | 60.45 | 4.89 | 9.33 | 7.62 | 6.94 |

EXAMPLE 22

Preparation of 2-Methyl-3-(4-hydroxy-2-methylphenyl)-6-sulf-amyl-7-chloro-1,2,3,4-tetrahydro-4-quinazolinone 2-Amino-4-chloro-5-sulfamyl-N-(4-hydroxy-2-methyl-phenyl)-benzamide (Procedure XXIII) (14.7 gm.) was slurried in 125 ml. acetic acid. 1,1-Dimethoxyethane (9 m.) was added, followed by 0.5 ml. sulfuric acid. The mixture was stirred 30 minutes, filtered, and stirred for another 2 hours and filtered to give 11.1 gm. crude product. Ten grams of this was recrystallized from 70 ml. ethylene glycol and dried at 140° to give 4.6 gm. of 2-methyl-3-(4-hydroxy-2-methylphenyl)-6-sulfamyl-7-chloro-1,2,3,4-tetrahydro-4-quinazolinone, m.p. 305–6.

|        | C     | H    | N     | Cl   | S    |
|--------|-------|------|-------|------|------|
| Calcd: | 50.33 | 4.22 | 11.00 | 9.29 | 8.40 |
| Found: | 50.13 | 4.34 | 10.91 | 9.36 | 8.15 |

EXAMPLE 23

Preparation of 3-(o-Ethylphenyl)-6-sulfamyl-7-chloro-1,2,3,4-tetrahydro-4-quinazolinone 2-Amino-4-chloro-5-sulfamyl-N-(o-ethylphenyl)-benzamide (Procedure XXIV) (25 gm.) was suspended in 200 ml. acetic acid, 6.1 gm. dimethoxymethane, and 1.0 ml. sulfuric acid added, and the mixture stirred 8 hours. The suspension was poured into water. The solid was filtered and purified by chromatography on silica and recrystallized from a mixture of dimethylformamide and water to give 10 gm. of 3-(o-ethylphenyl-6-sulfamyl-7-chloro-1,2,3,4-tetrahydro-4-quinazolinone, m.p. of 278–84.

|        | C     | H    | Cl   | N     | S    |
|--------|-------|------|------|-------|------|
| Calcd: | 52.52 | 4.41 | 9.69 | 11.49 | 8.76 |
| Found: | 52.23 | 4.29 | 9.78 | 11.56 | 8.57 |

EXAMPLE 24

Preparation of 3-(2,4,5-Trimethylphenyl)-6-sulfamyl-7-chloro-1,2,3,4-tetrahydro-4-quinazolinone 2-Amino-4-chloro-5-sulfamyl-N-(2,4,5-trimethyl-phenyl)-benzamide (Procedure XXV) (23 gm.) was suspended in 200 ml. acetic acid. Dimethoxymethane (6.1 gm.) was added and then 1 ml. sulfuric acid. The mixture was stirred 8 hours, poured into cold water, and the solid filtered and purified by chromatography on silica. The product was refluxed with chloroform, filtered and recrystallized from alcohol to give 2.5 gm. of 3-(2,4,5-trimethylphenyl)-6-sulfamyl-7-chloro-1,2,3,4-tetrahydro-4-quinazolinone, m.p. 216–30.

|        | C     | H    | N     | Cl   | S    |
|--------|-------|------|-------|------|------|
| Calcd: | 53.76 | 4.77 | 11.07 | 9.33 | 8.44 |
| Found: | 53.53 | 5.06 | 11.29 | 9.47 | 8.30 |

EXAMPLE 25

Preparation of 2-Methyl-3-(p-tolyl)-6-sulfamyl-7-chloro-1,2,3,4-tetrahydro-4-quinazolinone 2-Amino-4-chloro-5-sulfamyl-N-(p-tolyl)-benzamide (Procedure XXVI) (36.1 gm.) was mixed with 370 ml. acetic acid and 14.8 ml. of dimethoxyethane. Sulfuric acid (0.2 ml.) was added and the mixture stirred 4 hours. The solid was filtered and washed and recrystallized twice from alco-hol (3 liters and 2.5 liters), treating with 30 gm. charcoal during the second recrystallization, to give 28.0 gm. of 2-methyl-3-p-(tolyl)-6-sulfamyl-7-chloro-1,2,3,4-tetrahydro-4-quinazolinone, m.p. 302–3.5°.

|        | C     | H    | Cl   | N     | S    |
|--------|-------|------|------|-------|------|
| Calcd: | 52.53 | 4.41 | 9.69 | 11.49 | 8.76 |
| Found: | 52.67 | 4.46 | 9.61 | 11.66 | 9.06 |

EXAMPLE 26

Preparation of 2-Methyl-3-(2-methyl-4-methoxyphenyl)-6-sulf-amyl-7-chloro-1,2,3,4-tetrahydro-4-quinazolinone 2-Amino-4-chloro-5-sulfamyl-N-(4-methoxy-2-methyl-phenyl)-benzamide (Procedure XXVII) (16.5 gm.) was slurried in 150 ml. acetic acid. Dimethoxyethane (6 ml.) and 5 drops of sulfuric acid were added. The mixture was stirred 2 hours, filtered, and the solid washed with acetic acid, then with isopropanol and then with ether to give 13.5 gm. of 2-methyl-3-(2-methyl-4-methoxyphenyl)-6-sulfamyl-7-chloro-1,2,3,4-tetrahydro-4-quinazolinone, m.p. 229–30.

|        | C     | H    | Cl   | N     |
|--------|-------|------|------|-------|
| Calcd: | 51.58 | 4.58 | 8.96 | 10.61 |
| Found: | 51.30 | 4.62 | 9.00 | 10.48 |

EXAMPLE 27

Preparation of 2-Methyl-3-(p-sulfamylphenyl)-6-sulfamyl-7-chloro-1,2,3,4-tetrahydro-4-quinazolinone 4-Chloro-5-sulfamyl-N-(p-sulfamylphenyl)-anthranil-amide (Procedure XXVIII) (6.6 gm.) was dissolved in 75 ml. dimethylformamide and 2 drops of sulfuric acid added. The mixture was heated to 70° and 2 ml. 1,1-dimethoxyethane added. The reaction mixture was heated at 50–90° for 2½ hours. 1,1-Dimethoxyethane (0.5 ml.) was added, the mixture heated at 90–110° for an additional three-fourth hour and concentrated to dryness under vacuum. The residue was chromatographed on silica and the product washed with water and recrystallized from a mixture of methoxyethanol (30 ml.) and chloroform (10 ml.) to give 3.6 gm. of 2-methyl-3-(p-sulfamylphenyl)-6-sulfamyl-7-chloro-1,2,3,4-tetrahydro-4-quinazolinone, m.p. 257–9.

1-chloro-2,2-dimethoxyethane were added. The reaction mixture was kept at 90–5° for 10 minutes, stirred 20 minutes without heating, cooled to 15° and poured into 1 liter of water. The solid was filtered, dissolved in 300 ml. alcohol and the solution concentrated to 175 ml. to give 16 gm. product which was purified by chromatography on silica to give 12 gm. solid. This was combined with 2.7 gm. product obtained from the alcohol mother liquor by chromatography and the combined solids were recrystallized from ethanol to give 11 gm. of product, m.p. 223–7° (another 1.3 gm. was obtained on concentration of the mother liquor).

|  | C | H | N | Cl | S |
|---|---|---|---|---|---|
| Calcd: | 48.02 | 3.78 | 10.5 | 17.71 | 8.01 |
| Found: | 47.98 | 3.82 | 10.58 | 17.94 | 7.93 |

EXAMPLE 36

Preparation of 2,2-Dimethyl-3-phenyl-6-sulfamyl-7-chloro-1,2,3,4-tetrahydro-4-quinazolinone 2-Amino-4-chloro-5-sulfamyl-N-phenylbenzamide (Procedure XIII) (2 gm.), acetone (2 ml.), acetic acid (20 ml.) and 2 drops of sulfuric acid were stirred 4 hours at room temperature. The solid was filtered, washed with acetic acid, then with ether and recrystallized from 40 ml. methanol to give 1.5 gm. of product, m.p. 273–8.

|  | C | H | N | Cl | S |
|---|---|---|---|---|---|
| Calcd: | 52.52 | 4.41 | 11.49 | 9.69 | 8.76 |
|  | 52.26 | 4.36 | 11.79 | 9.78 | 8.85 |

EXAMPLE 37

Preparation of 2-Methyl-2-carbethoxy-3-(o-tolyl)-6-sulfamyl-7-chloro-1,2,3,4-tetrahydro-4-quinazolinone 2-Amino-4-chloro-5-sulfamyl-N-(o-tolyl)-benzamide (Procedure VI) (5 gm.) was suspended in 50 ml. acetic acid. Ethyl pyruvate (4 gm.) was added, the mixture heated to 85° and 10 drops of sulfuric acid added. The mixture was cooled to room temperature and filtered. The solid was washed with isopropanol, then with ether to give 4.8 gm. of product, m.p. 261–3.

|  | C | H | Cl | N | S |
|---|---|---|---|---|---|
| Calcd: | 52.1 | 4.60 | 8.10 | 9.60 | 7.73 |
| Found: | 51.31 | 4.65 | 8.30 | 9.46 | 7.41 |
|  | 51.78 |  |  |  |  |

EXAMPLE 38

Preparation of 2-Carbethoxy-3-(o-tolyl)-6-sulfamyl-7-chloro-1,2,3,4-tetrahydro-4-quinazolinone 2-Amino-4-chloro-5-sulfamyl-N-(o-tolyl)-benzamide (Procedure VI) (7.0 gm.) was added to 30 ml. acetic acid at about 120°, then 5 gm. ethyl glyoxalate and 10 drops of sulfuric acid. The mixture was poured into 600 ml. water and filtered. The solid was boiled with 400 ml. isopropanol, and the mixture cooled and filtered to give 4.2 gm. of product, m.p. 155–60.

|  | C | H | N | Cl |
|---|---|---|---|---|
| Calcd: | 43.50 | 4.65 | 9.91 | 8.36 |
| Found: | 51.27 | 4.61 | 9.30 | 8.40 |

EXAMPLE 39

Preparation of 2-Ethyl-2-methyl-6-sulfamyl-7-chloro-1,2,3,4-tetrahydro-4-quinazolinone 2-Amino-4-chloro-5-sulfamylbenzamide (Procedure XXX) (10 gm.), 2-butanone (10 ml.), acetic acid (70 ml.) and 5 drops of sulfuric acid were mixed and stirred at room temperature for 3 hours. The solid was filtered, washed with acetic acid, then with ether and recrystallized from 50 ml. 50% aqueous dimethylformamide to give 7.9 gm., m.p. 300–2.

|  | C | H | N | Cl |
|---|---|---|---|---|
| Calcd: | 43.50 | 4.65 | 13.84 | 11.67 |
| Found: | 43.40 | 4.70 | 14.06 | 11.85 |

EXAMPLE 40

Preparation of 2-Hydroxymethyl-3-(o-tolyl)-6-sulfamyl-7-chloro-1,2,3,4-tetrahydro-4-quinazolinone a. 2-Amino-4-chloro-5-sulfamyl-N-(o-tolyl)-benzamide (Procedure VI) (12 gm.) was suspended in 125 ml. acetic acid. The mixture was heated to 80° and 8 gm. of benzyloxyacetaldehyde dimethylacetal was added followed by 2 ml. sulfuric acid. After 10 minutes at 80° the hot mixture was filtered and left overnight at room temperature. The solution was poured into 600 ml. water and the solid separated and recrystallized from 80 ml. alcohol to give 3.0 gm. of 2-benzyloxymethyl-3-(o-tolyl)-6-sulfamyl-7-chloro-1,2,3,4-tetrahydro-4-quinazolinone, m.p. 207–9°.

b. 2-Benzyloxymethyl-3-(o-tolyl)-6-sulfamyl-7-chloro-1,2,3,4-tetrahydro-4-quinazolinone (3 gm.) in 40 ml. tetrahydrofuran was reduced catalytically with 2 gm. 5% Pd/C. The catalyst was filtered off and the filtrate concentrated to give a solid which was recrystallized from alcohol to give 1.8 gm. of 2-hydroxymethyl-3-(o-tolyl)-6-sulfamyl-7-chloro-1,2,3,4-tetrahydro-4-quinazolinone, m.p. 241–3.

|  | C | H | N |
|---|---|---|---|
| Calcd: | 50.33 | 4.22 | 11.00 |
| Found: | 50.13 | 4.30 | 11.02 |

EXAMPLE 41

Preparation of 1-Methyl-3-(o-tolyl)-6-sulfamyl-7-chloro-1,2,3,4-tetrahydro-4-quinazolinone 35.4 Grams (0.1 mol) of 2-methylamino-4-chloro-5-sulfamyl-N-(o-tolyl)benzamide (Procedure XIX) was slurried in 350 ml. of glacial acetic acid, 9.9 grams (0.13 mol) of dimethoxymethane were added, followed by 0.5 ml. of concentrated sulfuric acid. The resulting mixture was stirred for three hours. The precipitated product was separated by filtration, washed with glacial acetic acid and then with ether, and dried in vacuo over $P_2O_5$. The dried product (m.p. 202–204°C.) can be recrystallized by dissolving in ethanol and concentrating the solution to about one third volume.

EXAMPLE 42

Preparation of 2-Methoxymethyl-3-(o-tolyl)-6-sulfamyl-7-chloro-1,2,3,4-tetrahydro-4-quinazolinone 2-Amino-4-chloro-5-sulfamyl-N-(o-tolyl)-benzamide (Procedure VI) (33.92 gm.) was suspended in 300 ml. acetic acid and heated to 70°. Concentrated sulfuric acid (0.7 ml.) was added and then 1,2,2-trimethoxyethane (14 gm.) was added dropwise during 3 minutes. The solid rapidly dissolved and the temperature was maintained for 10 minutes. The heat source was removed and after 20 minutes the reaction was cooled to room temperature and poured into 1 litter of water. The precipitate was filtered and dried to give 30 gm. of crude product. The product was refluxed with chloroform and filtered and the solid purified by chromatography followed by recrystallization from alcohol, m.p. 154-6.

|  | C | H | N |
|---|---|---|---|
| Calcd: $C_{17}H_{18}ClN_3O_4S$ + 1.1% $H_2O$ | 51.00 | 4.69 | 10.50 |
| Found: | 51.05 | 4.47 | 10.70 |

EXAMPLE 43

Preparation of 7'-Chloro-1-methyl-6'-sulfamyl-3'-(o-tolyl)-spiro-[piperidine-4,2'(1'H)-quinazolin]-4'(3'H)-one

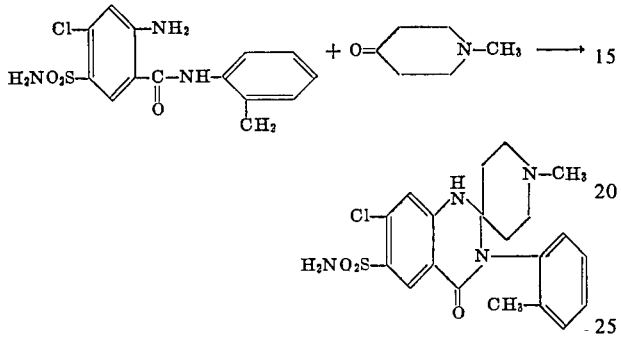

To a mixture of 67.9 gm. (0.2 mole) of 2-amino-4-chloro-5-sulfamyl-N-(o-tolyl)-benzamide (Procedure VI), 900 ml. glacial acetic acid and 30 gm. (0.265 mole) of 1-methyl-4-piperidone was added dropwise 20 ml. concentrated sulfuric acid. The mixture was stirred vigorously at room temperature for 24 hours. The glacial acetic acid was decanted from the oil and discarded. The oil was dissolved in 1 liter of water and after 1½ hours the mixture filtered and the solid discarded. The filtrate was treated with a saturated solution of sodium carbonate until a pH of 8 was reached. Water was added as needed to maintain mobility. Total volume of mixture was 3.5 liters. The solid was filtered, washed with water and air dried. After three recrystallizations from 95% ethanol obtained 60.0 gm. of solvated colorless crystals. Drying prod-uct at 131° in vacuo for 18 hours yielded a dry product, m.p. 219-222.5° (dec.).

|  | C | H | N | Cl | S |
|---|---|---|---|---|---|
| $C_{20}H_{23}ClN_4O_3S$: |  |  |  |  |  |
| Calculated | 55.23 | 5.33 | 12.88 | 8.15 | 7.37 |
| Found | 55.11 | 5.37 | 12.91 | 9.28 | 7.35, 7.23 |

EXAMPLE 44

Preparation of 7'-Chloro-6'-sulfamyl-3'-(o-tolyl)-spiro-[cyclopentane-1,2'(1'H)-quinazolin]-4'(3'H)-one

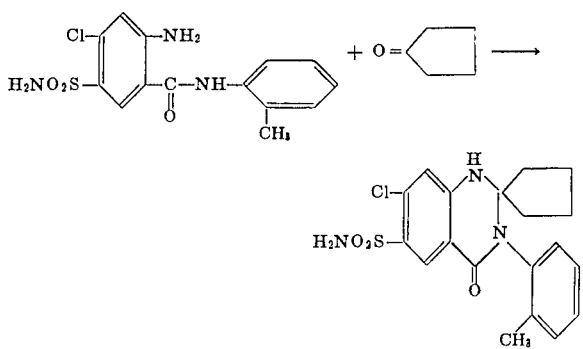

To a mixture of 17 gm. (0.05 mole) of 2-amino-4-chloro-5-sulfamyl-N-(o-tolyl)-benzamide (Procedure VI), 175 ml. glacial acetic acid and 10 ml. cyclopentanone was added 25 drops of concentrated sulfuric acid. The mixture was stirred at room temperature. After 2 hours another 10 ml. of cyclopentanone was added. After stirring the reaction mixture an additional 15 hours, the solid was filtered washed with glacial acetic acid and air dried. Yield 16.4 gm., m.p. 265-268°. After two recrystallizations from 95% ethanol the colorless crystalline solid melted at 268-270.5°.

|  | C | H | N | Cl | S |
|---|---|---|---|---|---|
| $C_{19}H_{20}ClN_3O_3S$: |  |  |  |  |  |
| Calculated | 56.22 | 4.97 | 10.35 | 8.73 | 7.90 |
| Found | 56.8, | 5.04 | 10.35 | 8.44 | 8.06 |

EXAMPLE 45

Preparation of 7'-Chloro-6'-sulfamyl-3'-(o-tolyl)-spiro-[cyclohexane-1,2'(1'H)-quinazolin]-4'(3'H)-one

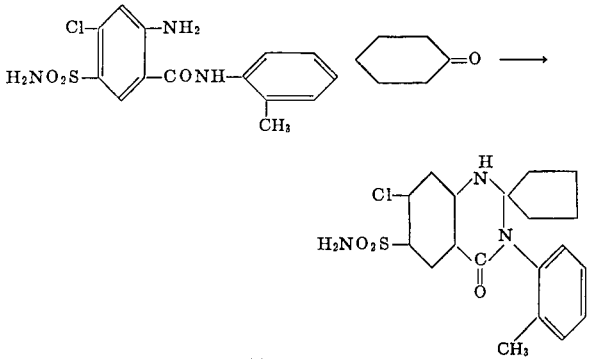

2-Amino-4-chloro-5-sulfamyl-N-(o-tolyl)-benzamide (Procedure VI) (20 gm.) was slurried in 200 ml. acetic acid. To the slurry was added 7.5 gm. of cyclohexanone and 6 drops of concentrated sulfuric acid. The mixture stirred for 5 hours, filtered, washed with ether and dried. The crude product was purified by dissolving in 70 ml. dimethylformamide, heating to 100° and adding 35 ml. of 100° water. After cooling, the product was filtered, washed twice with 25 ml. of a mixture of 3 parts of dimethylformamide and two parts of water, then three times with 50 ml. methanol and finally three times with 100 ml. ether. After drying in vacuo over phosphorus pentoxide the product weighed 20.5 gm. and melted at 291-293°.

EXAMPLE 46

Preparation of 2-Methyl-3-(3-chloro-2-methylphenyl)-6-sulfamyl-7-chloro-1,2,3,4-tetrahydro-4-quinazolinone 37.4 Grams (0.1 mol) of 2-amino-4-chloro-5-sulfamyl-N-(3-chloro-2-methylphenyl)benzamide was slurried in about 350 ml. of glacial acetic acid, 11.7 gram (0.13 mol) of 1,1-di-methoxyethane were added, followed by a few drops of concentrated sulfuric acid. The resulting mixture was stirred until reaction was complete. The precipitated product was separated by filtration, washed with glacial acetic acid and then with ether, and dried in vacuo over $P_2O_5$. The dried product (m.p. 264-267°C.) can be recrystallized by dissolving in ethanol and concentrating the solution to about one third volume.

EXAMPLE 47

37.8 Grams (0.1 mol) of 2-amino-4-chloro-5-sulfamyl-N-(o-trifluoromethylphenyl)benzamide was slurried in about 350 ml. of glacial acetic acid, 11.7 grams (0.13 mol) of 1,1-di-methoxyethane were added, followed by 0.5 ml. of concentrated sulfuric acid. The resulting mixture was stirred until reaction was complete. The precipitated product was separated by filtration, washed with glacial acetic acid, and then with ether, and dried in vacuo over $P_2O_5$. The dried product (m.p. 305–307°C.) can be recrystallized by dissolving it in ethanol and concentrating the solution to about one third volume.

EXAMPLE 48

Preparation of 2-Carboxy-7-chloro-6-sulfamyl-3-(o-tolyl)-1,2,3,4-tetrahydro-4-quinazolinone 2-Amino-4-chloro-5-sulfamyl-N-(o-tolyl)-benzamide (Procedure VI) (15 gm.) was slurried with 9 gm. glyoxylic acid monohydrate and 50 ml. glacial acetic acid. Ten drops of concentrated sulfuric acid was added and the mixture was stirred for 24 hours. Water (200 ml.) was added and the solid filtered, dried, and recrystallized from 1 liter of 80% isopropanol-water. Wt. = 4–5 gm., m.p. 180–95 (dec.).

|  | C | H | Cl | N |
|---|---|---|---|---|
| Calcd: | 48.55 | 3.56 | 10.62 | 8.96 |
| Found: | 47.36 | 3.85 | 10.07 | 9.05 |
|  | 48.19 | 4.23 | 9.75 |  |

EXAMPLE 49

Preparation of 1-Benzyl-2-methyl-3-(o-tolyl)-6-(N,N-dimethyl-sulfamyl)-7-chloro-1,2,3,4-tetrahydro-4-quinazolinone To a suspension of 2-benzylamino-4-chloro-5-(N,N-dimethylsulfamyl)-N-(o-tolyl)-benzamide (Procedure XXXI) 10 gm., in 150 ml. glacial acetic acid was added 8.0 gm. acetal followed by 2 ml. sulfuric acid. Reaction was stirred for 1 hour, the solid which had separated was filtered off, dried. Wt. = 8.0 gm. The solid was recrystallized from isopropanol to give 6.1 g. of the product. White solid, m.p. 183–4°C.

|  | C | H | Cl | N | S |
|---|---|---|---|---|---|
| $C_{25}H_{26}ClN_3O_3S$: |  |  |  |  |  |
| Calculated | 62.04 | 5.41 | 7.62 | 8.68 | 6.62 |
| Found | 62.33 | 5.41 | 6.46 | 8.86 | 6.64 |
|  | 62.36 | 5.66 | 6.40 | 8.77 | 6.88 |

EXAMPLE 50

Preparation of 7-Chloro-6-(N,N-dimethylsulfamyl)-2-methyl-3-(o-tolyl)-1,2,3,4-tetrahydro-4-quinazolinone Catalytic debenzylation of 8.0 gm. 1-benzyl-2-methyl-3-(o-tolyl)-6-(N,N-dimethylsulfamyl)-7-chloro-1,2,3,4-tetra-hydro-4-quinazolinone using 6.0 gm. Pd/C 5% catalyst in 70 ml. methanol at 60 psi gave only partial debenzylation, but re-crystallization of the crude product from isopropanol gave pure 7-chloro-6-(N,N-dimethylsulfamyl)-2-methyl-3-(o-tolyl)-1,2,3,4-tetrahydro-4-quinazolinone. Wt. = 2.1 gm., m.p. 252–4°C., color white.

|  | S |
|---|---|
| Calcd: | 8.14 |
| Found: | 8.41 |

EXAMPLE 51

Preparation of 2,2-Dimethyl-3-(o-tolyl)-6-sulfamyl-7-chloro-1,2,3,4-tetrahydro-4-quinazolinone

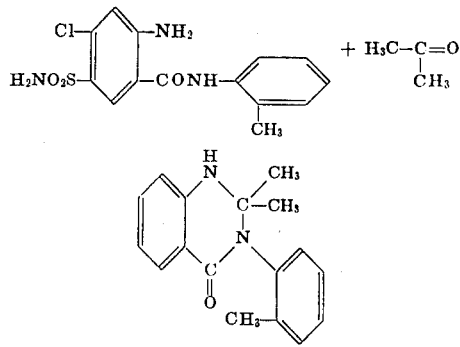

2-Amino-4-chloro-5-sulfamyl-N-(o-tolyl)-benzamide (18 gm., .053M) was suspended in a solution of acetone (20 ml.) and acetic acid (100 ml.) at room temperature. p-Toluenesulfonic acid (0.2 gm.) was added and the reaction was stirred for two hours. The insoluble solids were filtered and washed with acetic acid and diethyl ether, m.p. 259–262°C. Wt. = 20 gm. The product was recrystallized from 95% ethanol to give the compound, m.p. 267–272°. Wt. = 12 gm.

|  | C | H | N | Cl | S |
|---|---|---|---|---|---|
| $C_{17}H_{18}ClN_3O_3S$: |  |  |  |  |  |
| Calculated | 53.76 | 4.77 | 11.07 | 9.33 | 8.44 |
| Found | 53.87 | 4.87 | 11.04 | 9.32 | 8.61 |

EXAMPLE 52

Preparation of 2,2-Dimethyl-6-sulfamyl-7-chloro-1,2,3,4-tetrahydro-4-quinazolinone 2-Amino-4-chloro-5-sulfamylbenzamide (Procedure XXX) (10 gm.), acetone (10 ml.) and acetic acid (50 ml.) were stirred vigorously at room temperature and 5 drops of concentrated sulfuric acid added. After 1 hour, the solid was filtered, washed with acetic acid, then with ether and dried in vacuo at 105° for 3 hours. The product was dissolved in 20 ml. dimethylformamide, filtered, and 20 ml. hot water added to give 8.0 gm. of the product, m.p. 305–20°C. (dec.).

|  | C | H | Cl | N | S |
|---|---|---|---|---|---|
| Calcd: | 41.45 | 4.18 | 12.24 | 14.50 | 11.07 |
| Found: | 41.28 | 4.17 | 12.21 | 14.63 | 11.09 |
|  |  |  | 12.36 |  |  |

EXAMPLE 53

2-Methyl-3-(o-tolyl)-6-(N,N-dimethylsulfamyl)-7-chloro-1,2,3,4-tetrahydro-4-quinazolinone 2-Amino-4-chloro-5-(N,N-dimethylsulfamyl)-N-(o-tolyl)-benzamide (Procedure XXXI) (5.8 gm.) was suspended in 60 ml. acetic acid and 5 ml. 1,1-dimethoxyethane and 5 drops of sulfuric acid added. The mixture was stirred overnight, the solid filtered, washed with water and dried to give 4.7 gm. of 2-methyl-3-(o-tolyl)-6-(N,N-dimethylsulfamyl)-7-chloro-1,2,3,4-tetrahydro-4-quinazolinone, m.p. 252–4°.

EXAMPLE 54

2-Methyl-3-(o-tolyl)-6-sulfamyl-7-trifluoromethyl-1,2,3,4-tetrahydro-4-quinazolinone

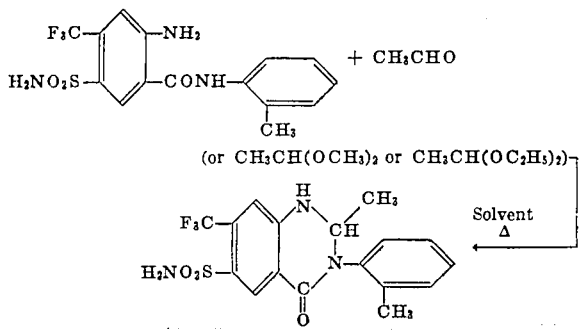

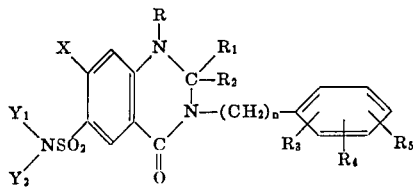

N-o-tolyl-4-trifluoromethyl-5-sulfamyl-anthranilamide is treated with acetaldehyde or dimethoxyethane or diethoxyethane and heated on a steam bath using a solvent (e.g. methanol, dimethylformamide or diglyme), in an acid medium for a few hours. The reaction mixture is concentrated in vacuo and the product, 2-methyl-3-(o-tolyl)-6-sulfamyl-7-trifluoromethyl-1,2,3,4-tetrahydro-4-quinazolinone, is purified.

Other compounds contemplated by this invention can be prepared in the manner illustrated in the above examples.

The embodiments of the invention in which an exclusive property or privilege is claimed are defined aS follows:

1. A process for the preparation of a 6-sulfamyl-1,2,3,4-tetrahydro-4-quinazolinone represented by the formula

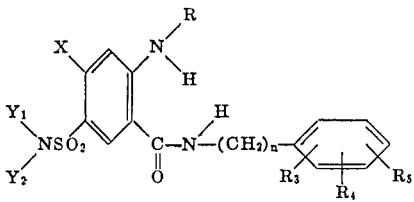

or a salt thereof wherein X is chlorine; $Y_1$ and $Y_2$ are independently hydrogen, methyl or acetyl; R is hydrogen methyl or benzyl; $R_1$ and $R_2$ are independently hydrogen, alkyl containing 1 to 4 carbon atoms, chloromethyl, dichloromethyl, hydroxy-methyl, methoxymethyl ethyl-thio-methyl, trifluoromethylthiomethyl, benzyl-thiomethyl cyclobutyl, cyclopentyl-methyl, phenyl or benzyl carbethoxy or carboxy; $R_1$ and $R_2$ taken together with the carbon atom to which they are attached are a spiro-cyclo-pentyl, spiro-cyclohexyl or a spiro-piperidine group; n is O or 1; and $R_3$, $R_4$ and $R_5$ are independently hydrogen, methyl, ethyl, methoxy, hydroxy, chloro, trifluoromethyl or the radical -$SO_2NH_2$; which comprises reacting an anthranilamide represented by the formula in acetic acid at ambient temperature with an acetal, aldehyde or ketone, represented respectively by the formulas

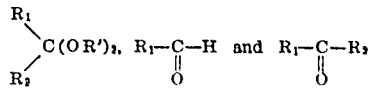

wherein R' is a hydrocarbon group

2. The process according to claim 1 wherein a slurry of 2-amino-4-chloro-5-sulfamyl-N-(o-tolyl)-benzamide is reacted with a molar excess of dimethyl acetal to produce 2-methyl-3-(o-tolyl)-6-sulfamyl-7-chloro-1,2,3,4-tetrahydro-4-quinazolinone.

3. The process according to claim 1 wherein 2-amino-4-chloro-5-sulfamyl-N-(o-tolyl)-benzamide is reacted with a molar excess of dimethoxy methane to produce 3-(o-tolyl)-6-sulfamyl-7-chloro-1,2,3,4-tetrahydro-4-quinazolinone.

4. The process according to claim 1 wherein a suspension of 2-amino-4-chloro-5-sulfamyl-N-(o-ethylphenyl)-benzamide is reacted with a molar excess of dimethoxymethane to produce 3-(o-ethylphenyl)-6-sulfamyl-7-chloro-1,2,3,4-tetrahydro-4-quinazolinone.

5. The process according to claim 1 wherein a suspension of 2-amino-4-chloro-5-sulfamyl-N-(2,4,5-trimethyl-benzamide is reacted with a molar excess of dimethoxymethane to produce 3-(2,4,5-trimethylphenyl)-6-sulfamyl-7-chloro-1,2,3,4-tetrahydro-4-quinazolinone.

6. The process according to claim 1 wherein 2-amino-4-chloro-5-sulfamyl-N-(p-tolyl)-benzamide is reacted with a molar excess of dimethoxyethane to produce 2-methyl-3-(p-tolyl)-6-sulfamyl-7-chloro-1,2,3,4-tetrahydro-4-quinazolinone.

7. The process according to claim 1 wherein 2-amino-4-chloro-5-sulfamyl-N-(4-methoxy-2methylphenyl)-benza-mide is reacted with a molar excess of dimethoxyethane to produce 2-methyl-3-(4-methoxy-2-methyl-phenyl)-6-sulfamyl-7-chloro-1,2,3,4-tetrahydro-4-quinazolinone.

8. The process according to claim 1 wherein 2-methylamino-4-chloro-5-sulfamyl-N-(o-tolyl)-benzamide is reacted with a molar excess of dimethoxymethane to produce 1-methyl-3-(o-tolyl)-6-sulfamyl-7-chloro-1,2,3,4-tetrahydro-4-quinazolinone.

9. The process according to claim 1 wherein 2-amino-4-chloro-5-sulfamyl-N-(o-trifluoromethylphenyl)-benzamide is reacted with a molar excess of 1,1-dimethoxyethane to produce 2-methyl-3-(o-trifluoromethylphenyl)-6-sulfamyl-7-chloro-1,2,3,4-tetrahydro-4-quinazolinone Preparation of 2-Methyl-3-(o-trifluoromethylphenyl)-6-sulfamyl-7-chloro-1,2,3,4-tetrahydro-4-quinazolinone

* * * * *

UNITED STATES PATENT OFFICE
CERTIFICATE OF CORRECTION

Patent No. 3,761,480              Dated September 25, 1973

Inventor(s) Bola Vithal Shetty, Rochester, N. Y.

It is certified that error appears in the above-identified patent and that said Letters Patent are hereby corrected as shown below:

Column 3, line 62, "toly" should read --tolyl--.

Column 6, line 21, "analysiss" should read --analysis--
Table in column 6, under "C" numeral "94.66" relating to "found" should read --49.66--.

Column 8, line 5, "m 50%" should read --ml 50%--

Column 8, line 6, "characoal" should read --charcoal--

Column 8, line 29, "fltered" should read -- filtered--

Column 12, line 6, "-(o-tolyl)-benzamide" should be deleted.

Column 14, line 50, "2-2 ml." should read --2 ml--

Column 16 in table of Example 18, line 36, "caldc." should read --calcd.--

Column 19, Parts of Example 30 have been included in Example 29. Example 29 should be corrected to read

--EXAMPLE 29

Preparation of 2-Chloromethyl-3-phenyl-6-sulfamyl-7-chloro-1,2,3,4-tetrahydro-4-quinazolinone 2-Amino-4-chloro-5-sulfamyl-N-phenylbenzamide (Procedure XIII) (15 gm.) was suspended in 100 ml. acetic acid and heated to 100°

UNITED STATES PATENT OFFICE
CERTIFICATE OF CORRECTION

Patent No. 3,761,480    Dated September 25, 1973

Inventor(s) Bola Vithal Shetty, Rochester, N. Y.

It is certified that error appears in the above-identified patent and that said Letters Patent are hereby corrected as shown below:

Chloroacetaldehyde dimethylacetal (7 ml.) was added and the mixture stirred for 2 minutes. Sulfuric acid (0.5 ml.) was added. After 2 minutes, the hot solution was poured into 400 ml. ice and water. The solid was filtered, washed with water, and recrystallized twice from 125 ml. alcohol to give 10.8 gm. of product, m.p. 205-10° (dried 4 hours at 110°).

|        | C     | H    | N     | Cl    | S      |
|--------|-------|------|-------|-------|--------|
| Calcd: | 46.64 | 3.39 | 10.88 | 18.36 | 8.30   |
| Found: | 46.51 | 3.38 | 10.81 | 18.36 | 8.37-- |

Column 21, lines 12, 13 and 14 numerals under "S" should read--
8.01, 8.01, 7.93

Column 21, line 59, numerals under "C" opposite calcd.: should read--
51.00; "H" should read 4.28 on same line--

Column 23, line 4 - heading "A" should read --C--.

Column 24, line 15, under column "C" opposite "found" numeral "56.8" should read --56.38--.

Column 25, Example 47, add title at beginning of paragraph --
Preparation of 2-Methyl-3-(o-trifluoromethylphenyl)-6-sulfamyl-7-chloro-1,2,3,4-tetrahydro-4-quinazolinone--

Column 26, Example 51, under "H" in table opposite "found", numeral "4.87" should read --4.85--.

UNITED STATES PATENT OFFICE
CERTIFICATE OF CORRECTION

Patent No. 3,761,480                    Dated September 25, 1973

Inventor(s) Bola Vithal Shetty, Rochester, N. Y.

It is certified that error appears in the above-identified patent and that said Letters Patent are hereby corrected as shown below:

Column 26, Example 53, line 54, "cbloro" should read --chloro--.

Column 27, line 27, "aS" should read --as--.

Column 28, under Claim 9, delete the following: --"Preparation of 2-Methyl-3-(o-trifluromethylphenyl)-6-sulfamyl-7-chloro-1, 2, 3, 4-tetrahydro-4-quinazolinone"--.

Signed and sealed this 4th day of June 1974.

(SEAL)
Attest:

EDWARD M. FLETCHER, JR.
Attesting Officer

C. MARSHALL DANN
Commissioner of Patents